(12) United States Patent
Collins et al.

(10) Patent No.: US 6,484,397 B1
(45) Date of Patent: Nov. 26, 2002

(54) METHOD OF ASSEMBLING A CATALYTIC CONVERTER FOR USE IN AN INTERNAL COMBUSTION ENGINE

(75) Inventors: Thomas A. Collins, Horseheads, NY (US); Gregory Eisenstock, Painted Post, NY (US); Robert J. Locker, Corning, NY (US); Robert A. Morse, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/794,929

(22) Filed: Feb. 26, 2001

Related U.S. Application Data

(60) Provisional application No. 60/217,280, filed on Jul. 11, 2000.

(51) Int. Cl.⁷ .................................................. B23P 15/00
(52) U.S. Cl. .......................................... 29/890; 29/515
(58) Field of Search ........................... 29/890, 428, 515; 422/188, 171, 180

(56) References Cited

U.S. PATENT DOCUMENTS

| | | | |
|---|---|---|---|
| 4,011,651 A | | 3/1977 | Bradbury et al. |
| 4,093,423 A | | 6/1978 | Neumann |
| 5,082,479 A | | 1/1992 | Miller |
| 5,273,724 A | | 12/1993 | Bos |
| 5,724,735 A | * | 3/1998 | Ickes et al. ................... 29/515 |
| 5,729,902 A | * | 3/1998 | Wieres et al. ................. 29/890 |
| 5,953,817 A | * | 9/1999 | Watanabe et al. ............. 29/890 |
| 6,185,820 B1 | * | 2/2001 | Foster .......................... 29/890 |
| 6,192,581 B1 | * | 2/2001 | Tsukamoto ................... 29/830 |
| 6,293,010 B1 | * | 9/2001 | Umin et al. ................... 29/508 |
| 6,299,843 B1 | * | 10/2001 | Locker et al. ................. 29/890 |
| 6,305,081 B1 | * | 10/2001 | Beaver ......................... 29/890 |
| 6,324,758 B1 | * | 12/2001 | Huang et al. ................. 29/515 |

FOREIGN PATENT DOCUMENTS

| | | |
|---|---|---|
| EP | 0 947 673 | 10/1999 |
| JP | 58-204913 | 11/1983 |
| WO | 99/28604 | 6/1999 |
| WO | 00/73637 | 12/2000 |

OTHER PUBLICATIONS

JP58204913, Nov. 29, 1983, Patent Abstracts of Japan, vol. 008, No. 050, Mar. 7, 1984.
JP55164713, Dec. 22, 1980, Patent Abstracts of Japan, vol. 005, No. 039, Mar. 14, 1981.

* cited by examiner

*Primary Examiner*—I Cuda Rosenbaum
(74) *Attorney, Agent, or Firm*—Kees van der Sterre; Timothy M. Schaeber

(57) ABSTRACT

A method of assembling a catalytic converter comprising the steps of: (1) providing a metal shell exhibiting a predetermined shape that substantially matches the shape of the ceramic substrate; (2) inserting into the metal shell a sufficient amount of a resilient supporting mat material to form a encircling mat layer; (3) compressing the encircling mat layer to an initial gap bulk density, the initial gap bulk density being higher than the final gap bulk density; (4) releasing the compression on the mat layer and prior to the mat layer reaching its final gap bulk density, inserting at least a portion of the substrate into the encircling mat layered metal shell and then allowing the mat layer to further release until the mat layer is compressed against the ceramic substrate at the final predetermined gap bulk density.

10 Claims, 21 Drawing Sheets

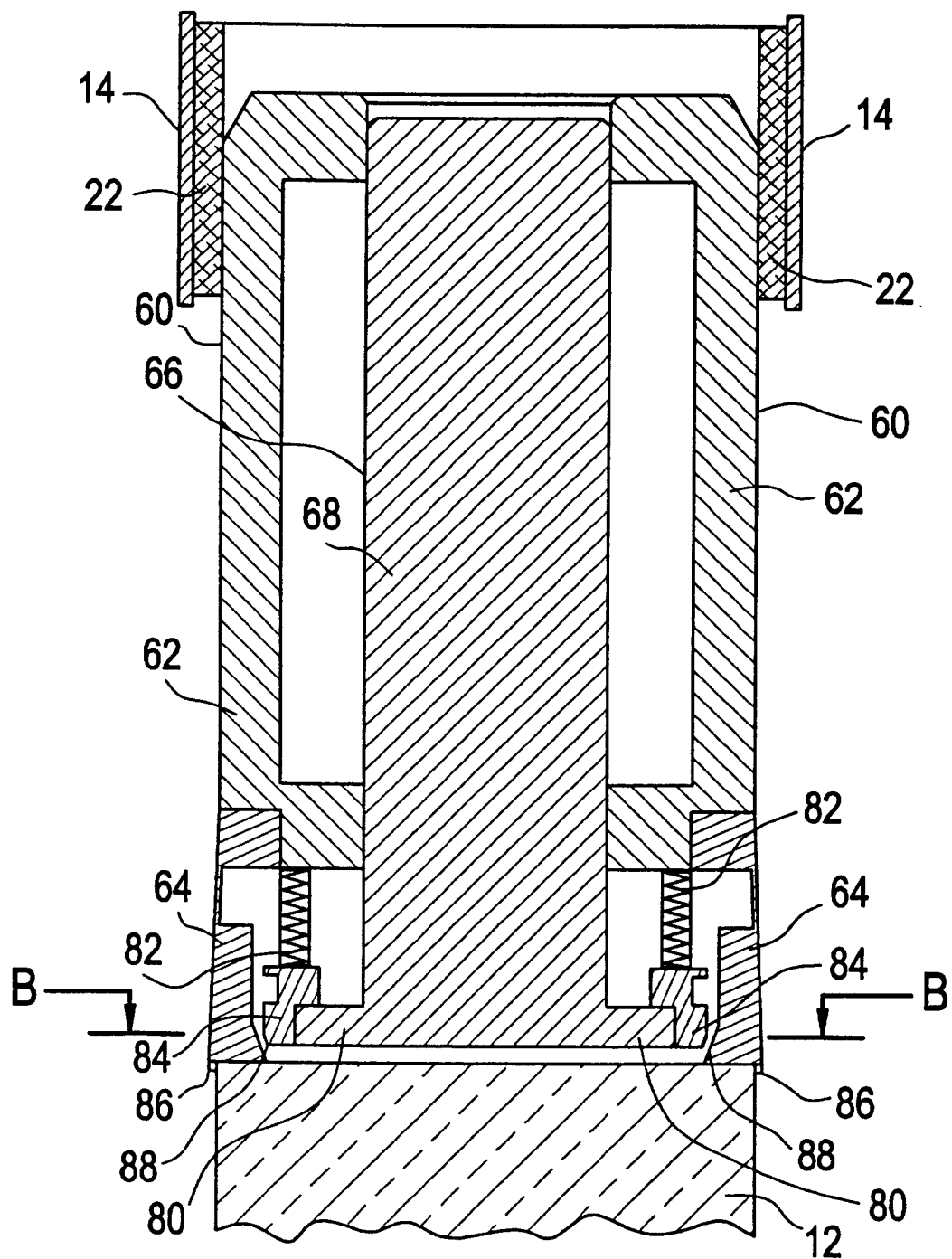

▲ Final Pressure On Substrate

▲ Final Pressure On Substrate
■ Canning Process Pressure On Substrate

METHOD OF ASSEMBLING A CATALYTIC CONVERTER FOR USE IN AN INTERNAL COMBUSTION ENGINE

This application claims the benefit of U.S. Provisional Application No. 60/217,280, filed Jul. 11, 2000, entitled "Method of Assembling a Catalytic Converter for Use in an Internal Combustion Engine", by Eisenstock et al.

BACKGROUND OF THE INVENTION

1. Field of the Invention

The invention relates to a process for the production of catalytic converters for purifying exhaust gases, and more particularly to a method for producing the catalytic converter comprising pre-forming the metal shell and compressing the supporting mat material against the metal shell.

2. Description of the Related Art

As is well known, the purification of exhaust gases from internal combustion engines, particularly in motor vehicles, is generally achieved by an exhaust gas purification system in which a ceramic element having a honeycomb cell structure acts a catalyst carrier. More precisely, this honeycomb cell structure is covered with a catalyst that contains a precious metal which functions, in the presence of $O_2$, to convert noxious components of the exhaust gas, such as HC and CO, to $H_2O$ and $CO_2$. The honeycomb cell structure is housed within a gas-tight, sheet metal or cast-metal heat resistant housing or can/shell.

Honeycomb structures currently employed are typically comprised of a ceramic material such as cordierite; a brittle material exhibiting limited mechanical strength. For this reason, catalytic converters in use today, typically include a resilient supporting mat that is wrapped around the periphery of the honeycomb. This resilient material, which distributes any compressive forces uniformly on the ceramic, typically expands as the temperature increases. This being the case, the compressive supporting pressure on the honeycomb therefore increases at elevated temperatures, and in some degree compensates for the thermal expansion of the outer metal shell. Since the metal shell expands more than the enclosed ceramic honeycomb, this mat expansion with temperature rise, prevents the honeycomb from becoming loose in the shell.

There are known in the art various techniques for assembling the mat and ceramic monolith into a can to make catalytic converters as described above. In general, the existing techniques can be divided into two groups: (1) those processes where preliminarily established gap, between the ceramic monolith and the metal shell is maintained during assembly (e.g., Stuff mounting or Clam Shell techniques); (2) those processes where a predetermined pressure, between the metal shell and the ceramic monolith is maintained during assembly (e.g., Shoe-box and Tourniquet techniques).

Stuff mounting techniques involve initially wrapping the substrate in a resilient mat and thereafter inserting the wrapped substrate into a conical device that compresses the mat as it is pushed through. The wrapped substrate is then ejected from the compression cone into a cylindrical tube that serves as the converter container or shell (see, for example U.S. Pat. No. 4,093,423 (Neumann).

Clam shell style of canning involves the utilization of two metal shell halves which are closed around a mat-wrapped honeycomb and thereafter welded together; (see for example U.S. Pat. No. 5,273,724 (Bos).

The method of fabrication, commonly referred to as the "tourniquet wrap" method, involves forming a rectangular flat sheet metal piece into a cylindrical body having a lap joint. A mat-wrapped honeycomb is loosely inserted into the cylindrical metal can and the combined assembly is pulled together to form the desired mat compression. Thereafter, the lap joint is welded together thereby holding the can at the desired compression while at the same time preventing gas leakage; see for Example U.S. Pat. No. 5,082,479 (Miller).

It is known that the amount of compressive pressure exerted on a given honeycomb substrate as a result of compressively closing the metal shell and supporting mat around the honeycomb substrate, as is done in any of the prior art methods described above, is significantly affected by the honeycomb's outside diameter, the thickness and compliance of the supporting mat material and the metal shell dimensions. Each of these dimensions have manufacturing tolerances which must be carefully controlled to insure that adequate, but not excessive, radial pressure, is applied to the honeycomb substrate. The prior art methods of assembling catalytic converters discussed above all involve subjecting the ceramic substrate to uneven and indirect compressive forces during the assembly, as a result of the exertion of compression on the metal shell or compression of the aforementioned conical device. The compression on the metal shell can result in damage to the substrate from the crushing forces applied, with the risk of damage increasing in the case of advanced substrates having extremely thin cell walls and surrounding skin.

Other disadvantages of these prior art techniques include resultant gap variations, instantaneous pressure peaks due to high closure rate, non-uniform pressure distribution, especially with non-round monolith. Because the mat is a viscoelastic material at room temperature, the compression pressure is rate dependent, e.g., the faster it is compressed, the higher the pressure and thus the higher the resultant undesirable pressure peaks that the ceramic monolith is subjected to. Again this disadvantage becomes more problematic as the substrates produced and utilized exhibit thinner cell walls.

As such, there remains a need for, and it is thus an objective of this invention to provide, for a simpler, less labor-intensive, more efficient catalytic converter assembly process that achieves both a uniform mat density and a uniform compression on the ceramic substrate; particularly in a manner such that the maximum compression exerted at any time on the ceramic substrate does cause damage to the substrate. In particular, it is an objective of the instant invention, to disclose a method that avoids subjecting the ceramic monolith to undesirable pressure peaks that lead to high stresses in the brittle ceramic monoliths.

SUMMARY OF THE INVENTION

It is therefore an objective of the present invention to disclose an assembly method that overcomes the problems and shortcomings of the current compressive closing methods for assembling catalytic converters. In other words, the present invention discloses a method of assembling catalytic converters which achieves a compressive load upon the honeycomb structure which is sufficient to retain, but not damage the retained honeycomb substrate, and which is not subject to pressure peaks experienced by the prior art assembly methods.

This objective, as well as other objectives which will become apparent in the discussion that follows, are achieved, in accordance with the present invention as a result of the feature that the initial compression of the supporting mat is a result of the mat being compressed against metal shell; i.e., internal compression of the "mat against the shell". This is contrary to the compression in the prior art methods that involve the initial compression being external of the supporting mat and resulting in the metal shell compressing the supporting mat against the ceramic substrate, i.e., "metal shell and/or mat against the substrate". In other words, the instant assembly method comprises providing an encircled mat layered metal shell and compressing of the mat layer against the metal shell and subsequently releasing the compression of the supporting mat thereby subjecting the ceramic substrate to the far less intensive release compression of the supporting mat.

In general, the method of assembling these catalytic converters comprises the following steps: (1) providing an open-ended one piece metal shell; (2) positioning a layer of resilient mat material on the inside surface of the metal shell to form an encircling mat layer; (3) compressing the encircling mat layer; and, (4) inserting the ceramic substrate into the metal shell while retaining the encircling mat layer on the inside surface of the metal shell.

In a more detailed embodiment the method of assembling these catalytic converters comprises the following basic steps: (1) providing a metal shell exhibiting a predetermined shape that substantially matches the shape of the ceramic substrate; (2) inserting into the metal shell a sufficient amount of a resilient supporting mat material to form an encircling mat layer; (3) compressing the encircling mat layer to an initial gap bulk density, the initial gap bulk density being equal to or higher than a predetermined final gap bulk density; (4) releasing the compression on the mat layer and, prior to the mat layer reaching its final gap bulk density, inserting at least a portion of the substrate into the encircling mat layered metal shell and then allowing the mat layer to further release until the mat layer is compressed against the ceramic substrate at the final predetermined gap bulk density.

BRIEF DESCRIPTION OF THE FIGURES

FIGS. 10A–10B are cross-sectional illustrations of illustrate a modified inventive embodiment of the fourth embodiment of assembling a catalytic converter;

DETAILED DESCRIPTION OF THE INVENTION

The present invention relates to a process of assembling catalytic converters, and more particularly to a method of assembling catalytic converters which achieves a compressive load upon the honeycomb structure that is sufficient to retain, but not damage the retained honeycomb substrate, and which only subjects the ceramic substrate to mat release compression which is far less intensive than the compression the substrate is subject to in the prior art methods of assembling catalytic converters. Stated differently, the instant process avoids subjecting the honeycomb substrate to the normally high pressure compressive force peaks that are typical in the standard compression methods of forming catalytic converters.

Figure 1A:
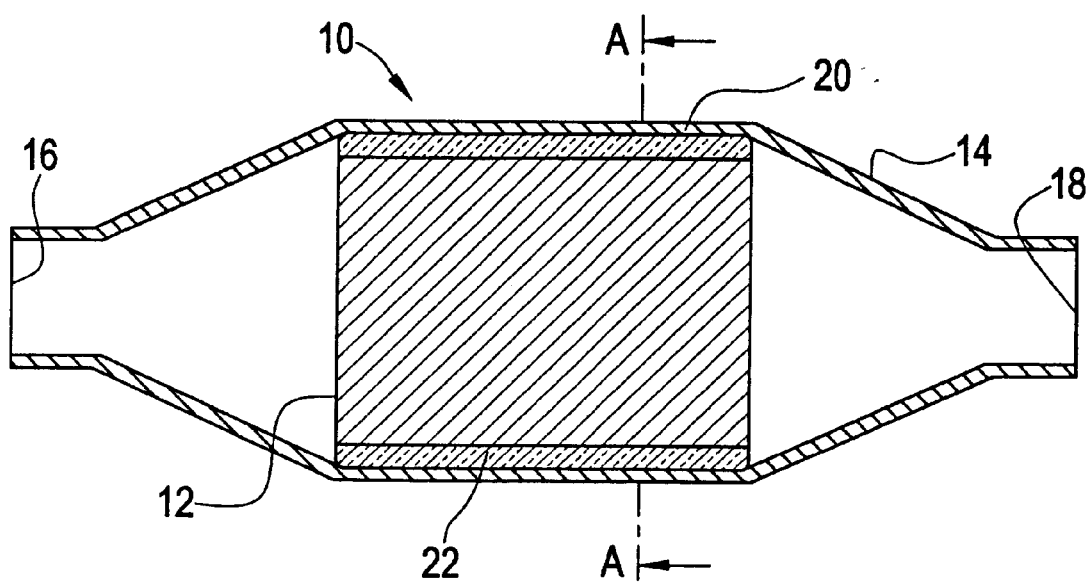
FIG. 1A is a schematic longitudinal sectional view of a catalytic converter, having a honeycomb structure, made in accordance with the method described herein.
Figure 1B:
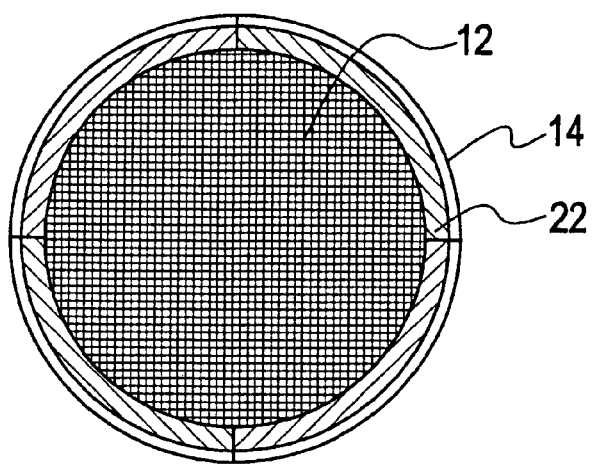
FIG. 1B is a cross-sectional view of the converter of FIG. 1 taken along the section line A—A.

FIGS. 1A and 1B, illustrate a typical catalytic converter comprising a ceramic honeycomb structure which functions as the catalyst structure or carrier. The catalytic converter 10 comprises a cylindrical ceramic honeycomb 12 and metal casing/shell or can 14 enclosing the same. Metal shell 14 is formed of a material capable of resisting under-car salt, temperature and corrosion; ferritic stainless steels including grades SS-409, SS-439, and more recently SS-441 are however, generally preferred. The choice of material depends on the type of gas, the maximum temperature and the like. Honeycomb 12 is formed by extruding a ceramic material such as cordierite. Metal shell 14 has inlet and outlet ports 16 and 18 and a main body portion 20. Gas introduced through inlet port flows through individual cells of honeycomb 12 and out through outlet port 18.

Ceramic honeycomb 12, has square cells, although the cells of the honeycomb may have shapes other than square, including triangular, rectangular and the like. In consideration of the tooling costs for extrusion molding or the like, however the cells are generally square in shape.

Ceramic honeycomb 12 is supported on the metal shell main body 20 by means of encircling layer of resilient ceramic fiber mat or wire mesh 22 for use as a shock absorber. Encircling mat layer 22 is typically formed ceramic fiber material, either a simple non-expanding ceramic material or an intumescent material, e.g., one which contains a vermiculite component that expands with heating to maintain firm compression when the outer steel expands outward from the ceramic monolith. Acceptable non-expanding ceramic fiber material include ceramic materials such as those sold under the trademarks "NEXTEL" and "SAFFIL" by the "3M" Company, Minneapolis, Minn. or those sold under the trademark "FIBERFRAX" and "CC-MAX" by the Unifrax Co., Niagara Falls, N.Y. Acceptable intumescent ceramics include materials such those sold under the trademark "INTERAM" by the "3M" Company, Minneapolis, Minn., as well as those intumescents which are also sold under the aforementioned "FIBERFRAX" trademark. Having a width substantially equal to the length of the honeycomb 12, the resilient mat layer mat 22 is interposed between ceramic body 12 and metal shell 14. The resilient mat layer once set presses the outer periphery of the honeycomb thereby fixing it against a drag caused by the gas flow.

Simply stated, typical processes for forming catalytic converters involve wrapping the substrate in a sufficient amount of supporting mat material and inserting the wrapped substrate into a generally cylindrical metal container, either compressively closing the container around the wrapped substrate or compressing the mat against the substrate and inserting the mat-wrapped substrate into the meal shell, to provide a gas tight seal and to hold the compressive stress.

The present invention relates to an improvement in the above-described process and involves, contrary to the aforementioned typical/standard processes, compressing the supporting mat against the metal shell rather than the ceramic honeycomb. In its simplest form the method of assembling a catalytic converter comprising a monolithic ceramic substrate encircled by a resilient supporting mat and mounted within a metal shell, involves the following steps: (1) providing an open-ended one piece metal shell; (2) positioning a layer of resilient mat material on the inside surface of the metal shell to form an encircling mat layer; (3) compressing the encircling mat layer; and, (4) inserting the ceramic substrate into the metal shell while retaining the encircling mat layer on the inside surface of the shell.

Various embodiments of the instant method for manufacturing a catalytic converter are depicted in FIGS. 2A–2C, 3, 4A–C, 5A–C, 8A–D and 10AB. Each of the embodiments comprises at least the following basic steps: (1) providing a metal shell 14 exhibiting a predetermined shape that substantially matches the shape of the ceramic substrate 12; (2) inserting into the metal shell 14 a sufficient amount of a resilient supporting mat material to form an encircling mat layer 22; (3) compressing the encircling mat layer 22 to an initial gap bulk density, the initial gap bulk density being equal to or higher than the final gap bulk density; (4) releasing the compression on the mat layer 22 and inserting at the substrate 12 into the encircling mat layered metal shell 14, thereby allowing the mat layer 22 to release until the mat layer is compressed against the ceramic substrate 12 at the final predetermined gap bulk density.

Figure 2A:
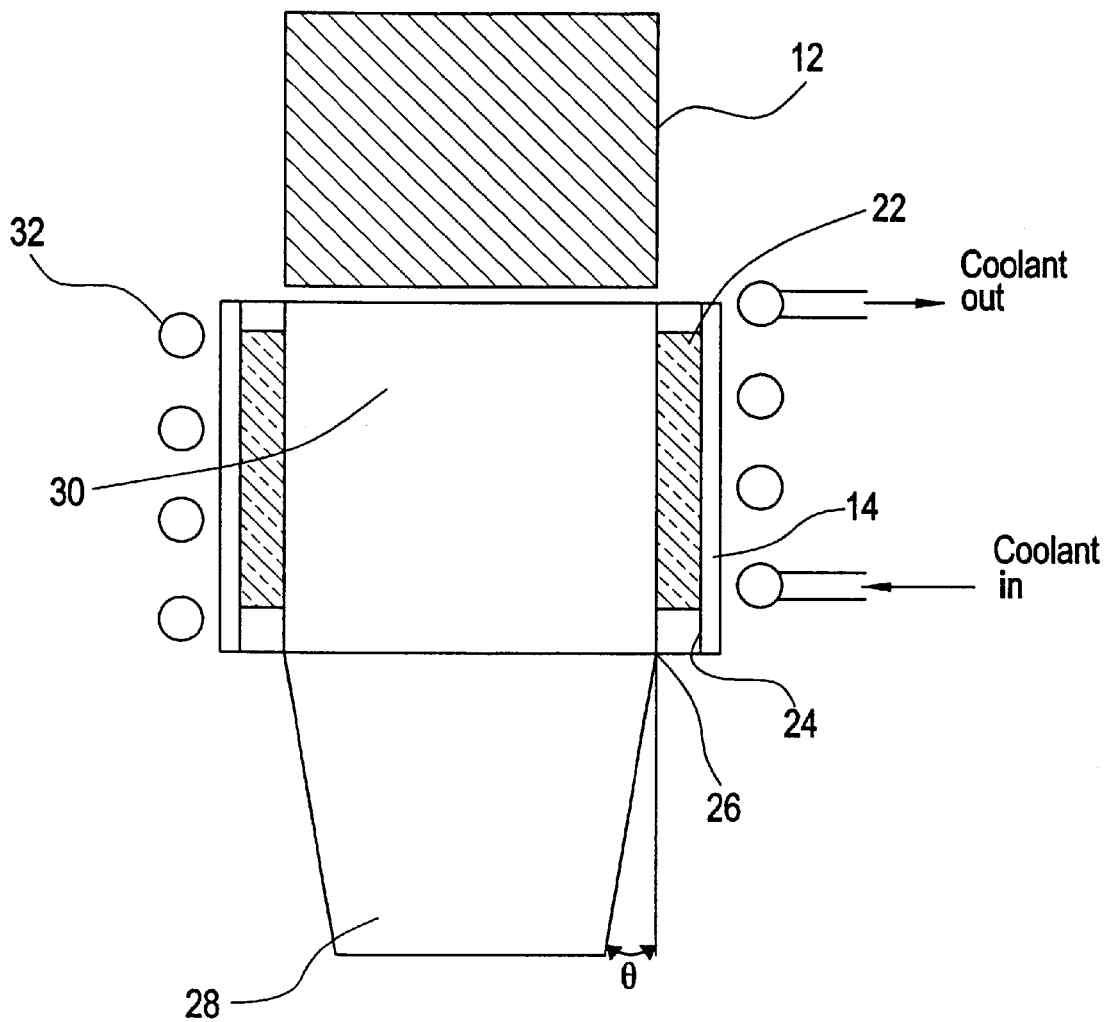
FIGS. 2A–2B are cross-sectional illustrations of the formation stages of a first embodiment of the instant method of assembling a catalytic converter.
Figure 2B:
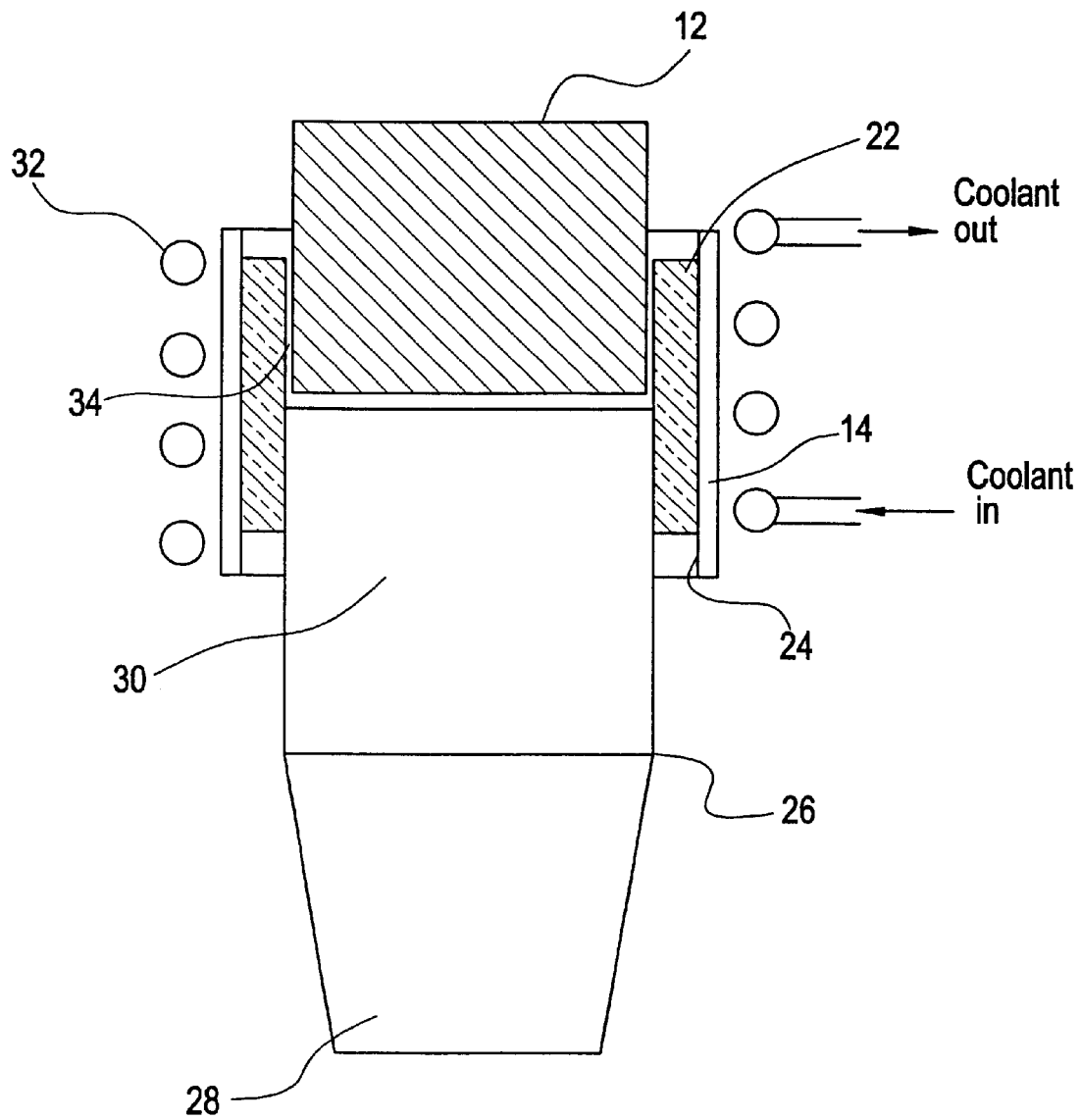

Referring now to FIGS. 2A–2C illustrated therein are the specific stages of a first embodiment of the fabrication of the catalytic converter 10 shown in FIGS. 1 and 2 and described in general terms above. In this embodiment the compressing step involves the utilization of a compression or arbor-like device 26. The compression device 26 exhibits a small portion 28 which functions to gradually compresses or precompresses the encircling mat and a large portion 30 that then functions to fully compress the supporting mat at the initial gap bulk density. In this embodiment, the small portion 28 is tapered and upon insertion into the metal shell functions to gradually compress the encircling mat layer 22 against the metal shell 14 as the compression device 26 is further inserted into the mat-layered metal shell 14, until the mat layer 22 is fully compressed by the compression device's large portion 30. The small or tapered portion 28 preferably has a taper angle (θ) of around 2 to 10°.

In this embodiment the large portion 30 comprises a straight cylindrical surface and exhibits the following dimensions: (1) a length at least as long as the width of the supporting mat 22; (2) a cross sectional shape that substantially matches that of the ceramic substrate 12; and (3) a cross sectional area that is equal to or larger than the cross sectional area exhibited by the ceramic substrate 12. The purpose of the cross-sectional area being larger than that of the ceramic substrate 12 is that once the compression device 26 is completely inserted the large or straight portion 30 compresses or squeezes the encircling mat layer 22 to an initial gap bulk density that is higher than that final gap bulk density for the finished product. This difference, resulting in an initial gap bulk density higher than final gap bulk density, allows the ceramic substrate 12 to be inserted into the position previously occupied by the compression device 26, without causing any damage to the supporting mat; assuming the supporting mat is held at this initial compression a sufficient time to allow removal of the compression device 26 and insertion of at least a portion the ceramic substrate 12.

It is contemplated that, alternatively, the compression device can comprises a conical shape. The base of the conical device; i.e., where it exhibits its largest diameter, should exhibit a cross sectional shape that substantially matches that of the ceramic substrate 12 and a cross sectional area that is equal to or larger than the cross sectional area exhibited by the ceramic substrate 12; i.e., the large portion of the compression device. The remaining portion of the conical device, top to base, functions to gradually compress the encircling mat (i.e. functions as the small portion), until the compression device is fully inserted whereby the largest diameter portion of the conical device contacts the encircling mat. As before, the result is, as above, the mat is compressed or squeezed to an initial gap bulk density that is higher than that final gap bulk density for the finished product.

Table I reports Target and Minimum gap bulk dimensions, as set by the mat material manufacturer, for various types of the aforementioned "INTERAM 100" supporting mat materials; the values listed represent varying weight basis (g/m$^2$) types of the INTERAM supporting mat materials.

TABLE I

| Mat Type (g/m$^2$) | Target gap, mm | Minimum gap, mm |
| --- | --- | --- |
| 2600 | 2.9 | 2.01 |
| 3100 | 3.4 | 2.51 |
| 3662 | 4.0 | 2.96 |
| 4070 | 4.5 | 3.29 |

The aforementioned compression device should be comprised of a material that exhibits a low coefficient of friction; preferably a static coefficient of friction of 0.15 or lower, determined as per JIS K-7125, more preferably 0.1 or lower. It is self-evident that the ideal static coefficient of friction is zero, but it is generally difficult to have a coefficient of 0.01 or lower due to material limitations. Suitable materials capable of providing the requisite low coefficient of friction include teflon-coated stainless steel or aluminum.

Referring specifically to FIGS. 2A and 2B the catalytic converter assembly method involves inserting the compression device's tapered portion into the mat layered metal shell 14 and the forcing compression device 26 downward into the mat-layered metal shell 14 until the straight portion 30 is aligned with the width of the mat layer 22 so as to fully compress the supporting mat 22. Once the compression device is completely inserted as, depicted in FIG. 2A, and the straight portion 30 is aligned with the encircling mat layer 22, the method next involves cooling and freezing the compressed mat layer 22 to hold the mat layer in compression at this initial gap bulk density, while the compression device 26 remains in position. One means for cooling the compressed supporting mat, as illustrated in FIGS. 2A and 2B, involves including on the outer surface of the metal shell 14, a hollow spiral tube 32 through which a coolant is supplied; the supplying of the coolant through the spiral tube (indicated as "coolant in" and "coolant out") functions to freeze the mat in its initial compressed position or initial gap bulk density. Any liquid that functions to freeze the mat in this initial compressed position is suitable for use, one example being the use of liquid nitrogen.

Referring specifically to FIG. 2B, following compression of the mat layer to an initial compressed position, the method next involves removing the compression device 26 by sliding it out of its position and subsequently inserting the ceramic substrate 12 into the mat-layered metal shell and into a position where it is aligned with the mat layer 22. This step occurs prior to the release of the initial compression of the mat layer 22 as it warms back up and the mat layer becomes compressed by the ceramic substrate 12 and the final gap bulk density of the mat layer is achieved. Note the gap between the frozen mat layer 22 and the ceramic substrate 12; this difference between initial gap bulk density and final gap bulk density allows the ceramic substrate 12 to be inserted into alignment with the mat layer without damaging the mat.

Figure 3:
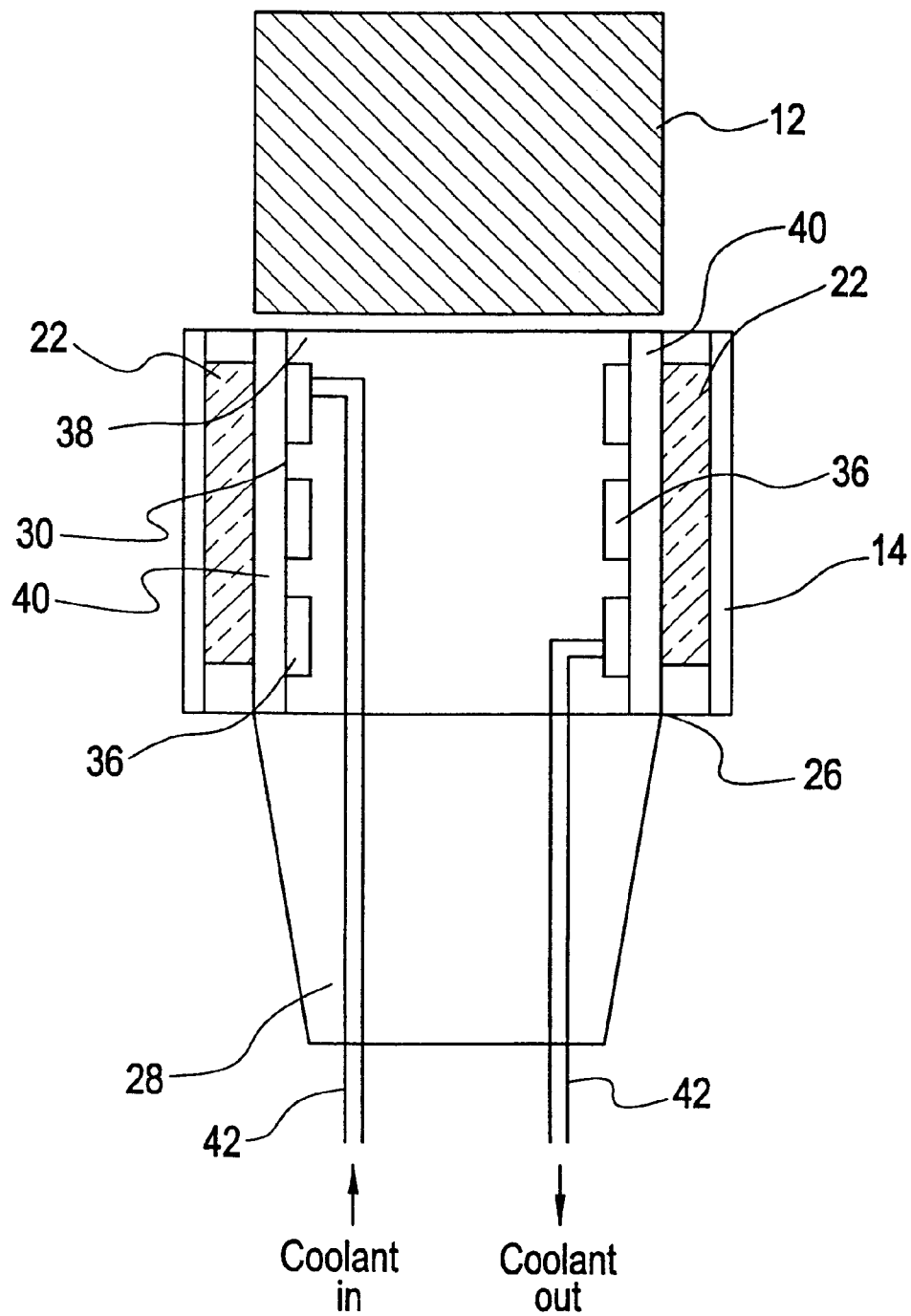
FIG. 3 is a cross-sectional illustration of a variation of the first embodiment of the instant method of assembling a catalytic converter.

Referring now to FIG. 3, illustrated therein is a modified embodiment of the apparatus for performing the aforementioned method described in conjunction with FIGS. 2A and 2B; the only difference being that the cooling (i.e., cooling and freezing of the mat at the initial gap bulk density) is performed internally via a spiral groove 36 rather than externally via a spiral tube. Specifically, the straight portion 30 comprises an inner portion 38 having a spiral groove 36 and an outer sleeve portion 40 that covers the inner portion 38 to form the grooves. The fluid is supplied (designated as "coolant in" and "coolant out") via a tube 42 that passes through the tapered portion 28 and connects with the internal cooling groove. Other than the cooling feature, this method of assembling the catalytic converter is the same as that described for FIGS. 2A and 2B and thus the same reference numerals in FIGS. 2A and 2B are given to the same or similar parts in FIG. 3, and explanation thereof is omitted.

Figure 4A:
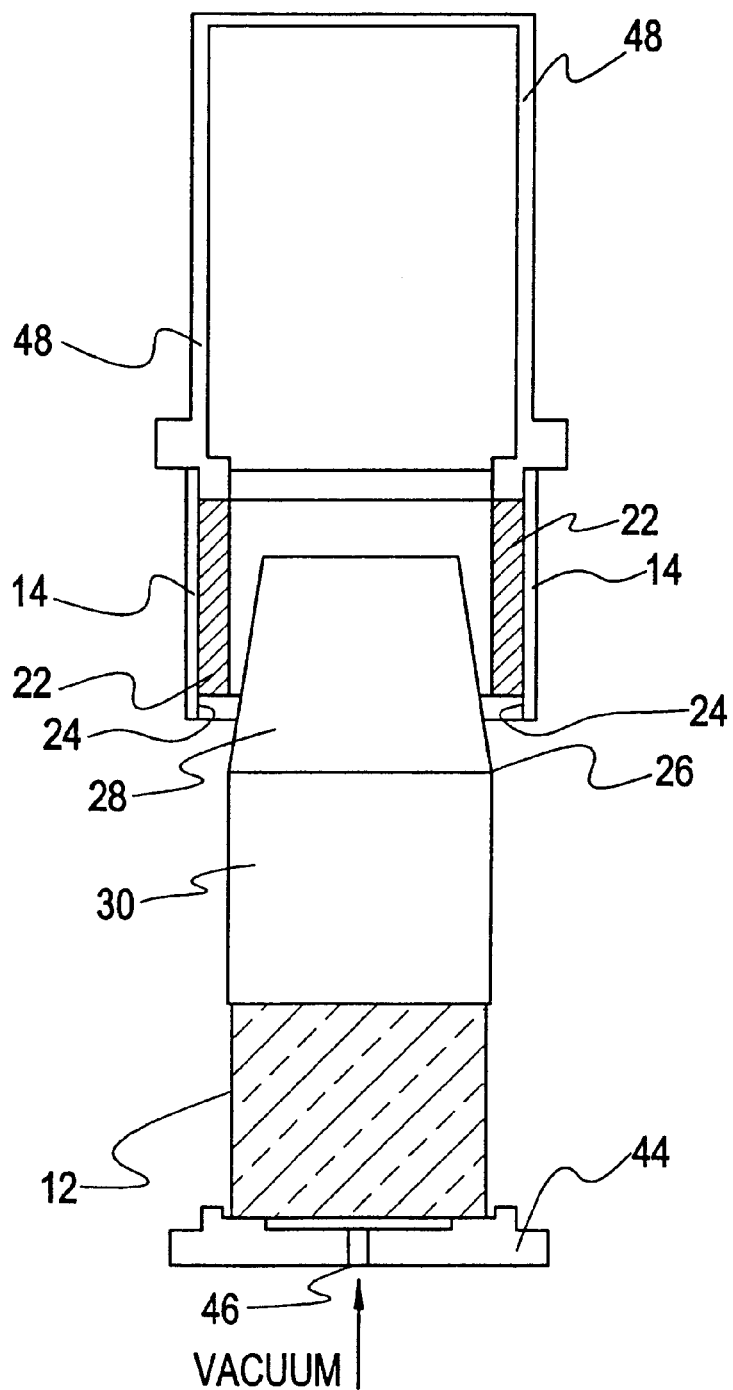
FIGS. 4A–4D are cross-sectional illustrations of the formation stages of a second embodiment of the instant method of assembling a catalytic converter.
Figure 4B:
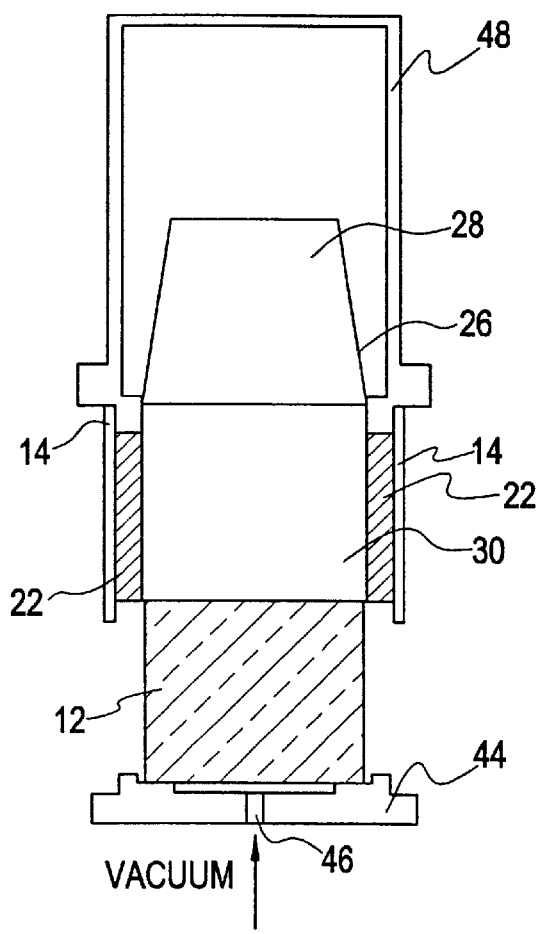

Referring now to FIGS. 4A–4B illustrated therein are the formation stages of a second embodiment of the instant method of assembling a catalytic converter. The method comprises use of a compression device as described above; a small tapered portion and a large straight portion. Referring initially to FIG. 4A, the first step involves placing the ceramic substrate 12 onto a supporting plate 44 and thereafter installing and securing the compression device 26 on the top surface of the ceramic substrate 12. The means for securing the compression device 26 in place can be any means capable of holding the compression device 26 in place. The means of securing in the instant invention includes having a vacuum connection line 46 that passes through the supporting plate 44 and communicates with the bottom surface of the ceramic substrate 12. Given the condition that the ceramic is a honeycomb cellular body, when a vacuum is pulled (designated "vacuum") it secures both the ceramic substrate 12, as well as the compression device 26 placed on the top surface of the ceramic substrate 12. The method next involves installing the mat layer 22 within the metal shell 14 in a manner as described above; inserting into the metal shell 14 a sufficient amount of the mat layer material 22 to form an encircling mat layered metal shell. The mat layered metal shell is then secured to a mounting plate 48.

Figure 4C:
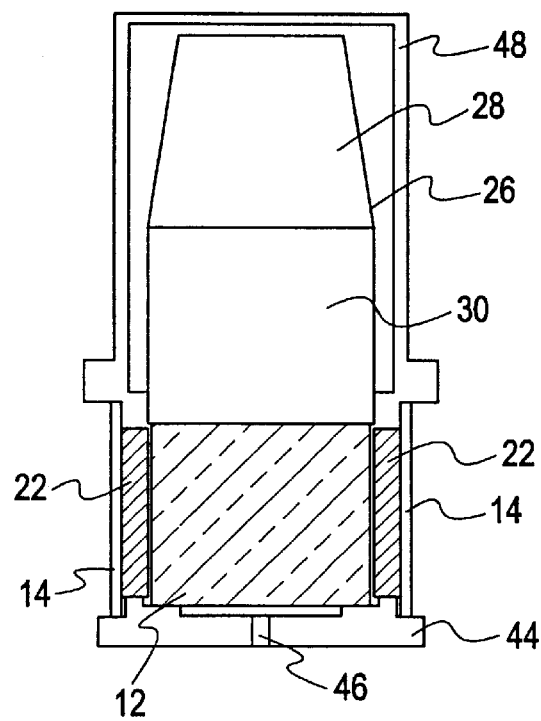

Referring now to FIG. 4B, the mounting plate 48 and the attached mat layered metal shell 14 are vertically aligned with the aforementioned mounted substrate/compression device configuration and thereafter exerting downward pressure on the mounting plate thereby sliding together the mat layered metal shell 14 and the mounted substrate/compression device until the mat layer 22 is aligned with the compression device straight portion 30. Referring now to FIG. 4C, the next step involves exerting further downward pressure on the mounting plate thereby moving the mounting plate 48 further down until it contacts the supporting plate 44 thus aligning the mat layer 22 with the ceramic substrate 12. As before, the cross-sectional shape and area of the compression device straight portion 30 substantially matches that of, and is larger than, the cross-sectional of the ceramic substrate 12. The result again being that when the straight portion 30 is aligned with the mat layer 22, the mat layer is compressed to an initial (higher) gap bulk density and subsequently when the mat layer 22 is aligned with the ceramic substrate 12 the mat is compressed to a lower final gap bulk density. Furthermore, an additional result of this assembly embodiment is that compressive force upon the mat layer 22 by the compression device 26 is applied evenly to the ceramic substrate surface 12 after ceramic substrate 12 is completely inside of the mat.

Unlike the first embodiment, this embodiment is a continuous process and it should be noted that the encircling mat release its initial compression once it is slid onto the substrate. Therefore the release of the encircling mat is a continuous process and continues as each portion of the mat slides over the compression device and onto the substrate, continuing until the encircling mat is fully positioned on the substrate. Although the leading portions of the mat may reach the final gap bulk density prior to the mat being fully position on the substrate the entire mat does not reach this final predetermined gap bulk density until the encircling mat layer is fully positioned on the substrate.

Figure 4D:
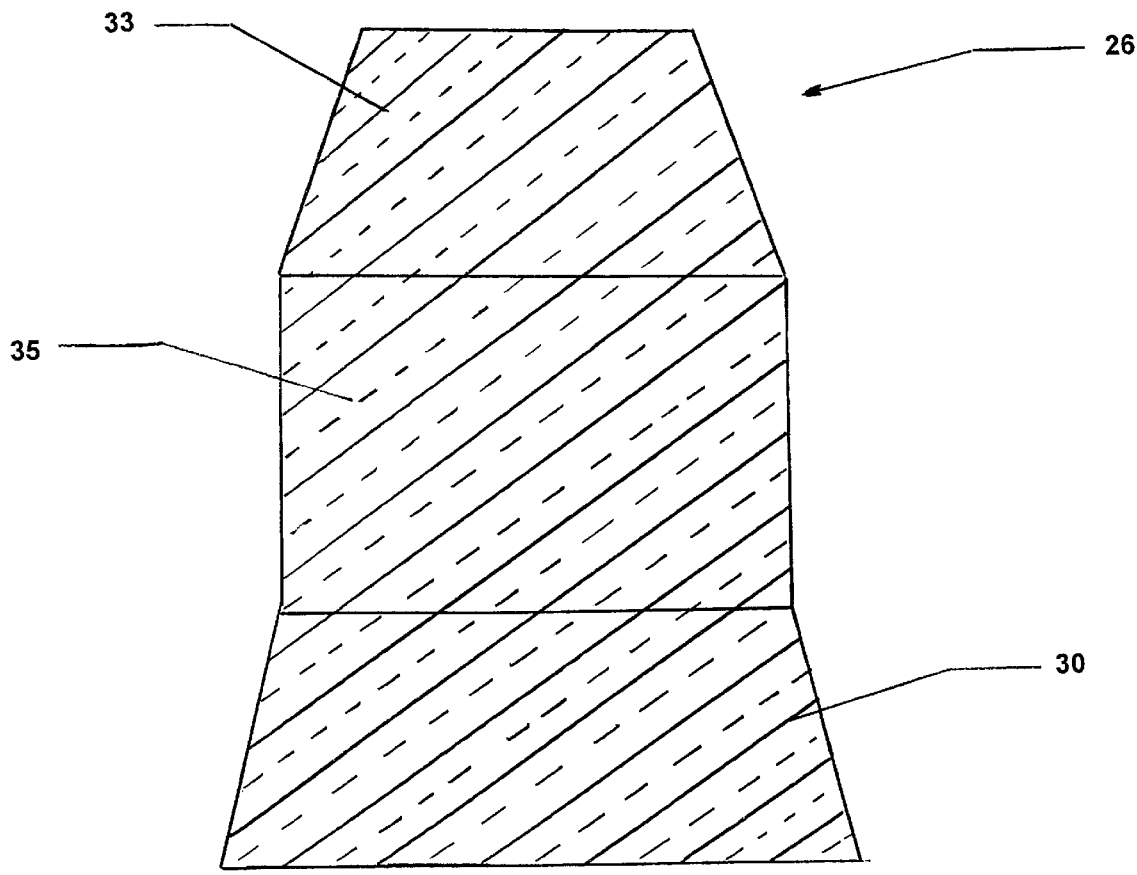

An alternative embodiment of the compression device for use in the second embodiment described above is illustrated in FIG. 4D. Specifically, the compression device's 26 small or precompressing portion is comprised of two parts; a tapered portion 33 and a straight portion 35. The large portion 30 is tapered with the base exhibiting a cross-sectional shape that substantially matches, and area that is larger than, the shape and cross-sectional area of the ceramic substrate 12.

Figure 5A:
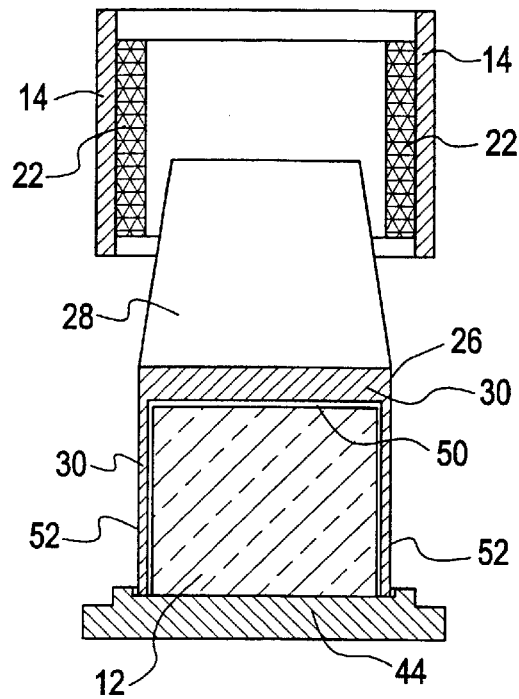
FIGS. 5A–5C are cross-sectional illustrations of the formation stages of a third embodiment of the instant method of assembling a catalytic converter.
Figure 5B:
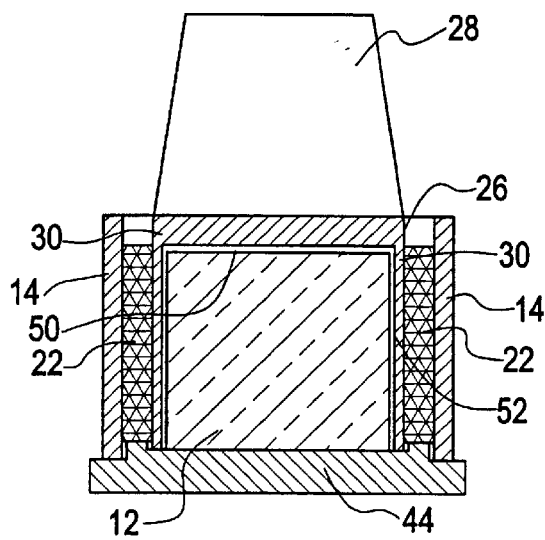
Figure 5C:
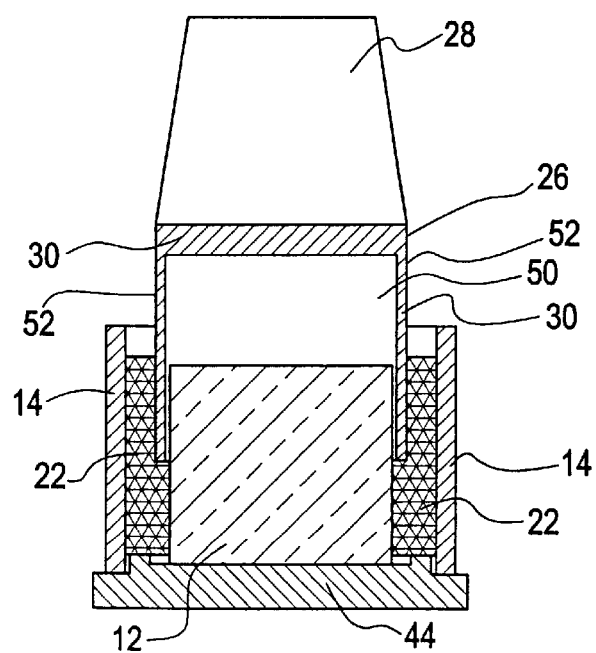

Referring now to FIGS. 5A–5C illustrated therein are the stages of a third embodiment of the fabrication of the catalytic converter 10 shown in FIGS. 1 and 2. In this embodiment the compression device 26 includes both a small tapered portion 28 and a large straight portion 30, with the straight portion 30 possessing a cavity portion 50. The straight portion's cavity 50 is sized such that the ceramic substrate 12 can be installed within the cavity 50 of the straight portion. Furthermore, the cavity portion's annular walls 52 are of a length at least as long as the width of the mat layer 22 while the circumferential shape of the annular walls 52 substantially matches that shape of the ceramic substrate 12.

FIG. 5A illustrates the initial step of the method which involves first inserting into the cavity portion 50 the ceramic substrate 12 and securing the ceramic substrate 12 within the cavity 50 with a supporting member 44 that is attached to the annular wall 52 of the compression device 26.

FIG. 5B, illustrates the next step of the method which involves sliding onto the compression device's tapered portion 30 the mat layered metal shell 14 and the forcing the mat layered metal shell 14 downward until straight cavity portion 50 is aligned with the width of the mat layer 22 and the end of the cavity annular walls 52 are abutted against the supporting member 44 thereby compressing the mat layer 22. The annular wall 52 positioned between the ceramic substrate 12 and the mat layer 22 functions to compress the mat layer 22 against the metal shell 12, like in previous embodiments, to a gap bulk density that is higher the final gap bulk density;

Referring now to FIG. 5C, the next step involves removing the compression device 26 and the supporting member 44, thereby gradually releasing the initial compression of the mat layer 22 and allowing the mat layer 22 to gradually relax and be compressed by the ceramic substrate 12. Once the compression device 26 is completely removed, the mat layer is compressed against the ceramic substrate 12 at the final and desired gap bulk density.

Referring now to FIGS. 6A–6D illustrated are the formation stages of a fourth embodiment of the fabrication of the catalytic converter 10 shown in FIGS. 1 and 2. Like the previous embodiments, the method comprises use of a compression device having a small portion and a large portion, however the compression device 60 in this embodiment comprises two adjacent parts, an outer sleeve 61 and an inner plunger 66. The outer sleeve 61 comprises a straight cylindrical portion 62 (the small portion) and a tapered, collet 64 that is radially expandable (the large portion); i.e., it contains a series of tapered leaves that make up its circumference. FIG. 7 is a top view, taken along line A—A of FIG. 9A, of the collet and its associated leaves. In the embodiment shown the compression device's collet 64 includes 8 expandable leaves 64A–64H; the actual number of leaves utilized is not critical to the invention. The plunger 66, like the outer sleeve 61, comprises two parts, as well. A plunger straight portion 68 is located within the outer sleeve's straight portion 62 and is in contact with, and is capable of sliding along the inner wall of straight portion 62. A plunger tapered portion 70 is located within the tapered collet 64 and is in contact with, and is capable of sliding along the inner wall of the tapered collet. The plunger tapered portion 70 further includes, embedded into its bottom surface, at least two springs 72. As will be explained later, the springs and the plunger tapered portion function to cause the leaved collet to expand radially.

Figure 6A:
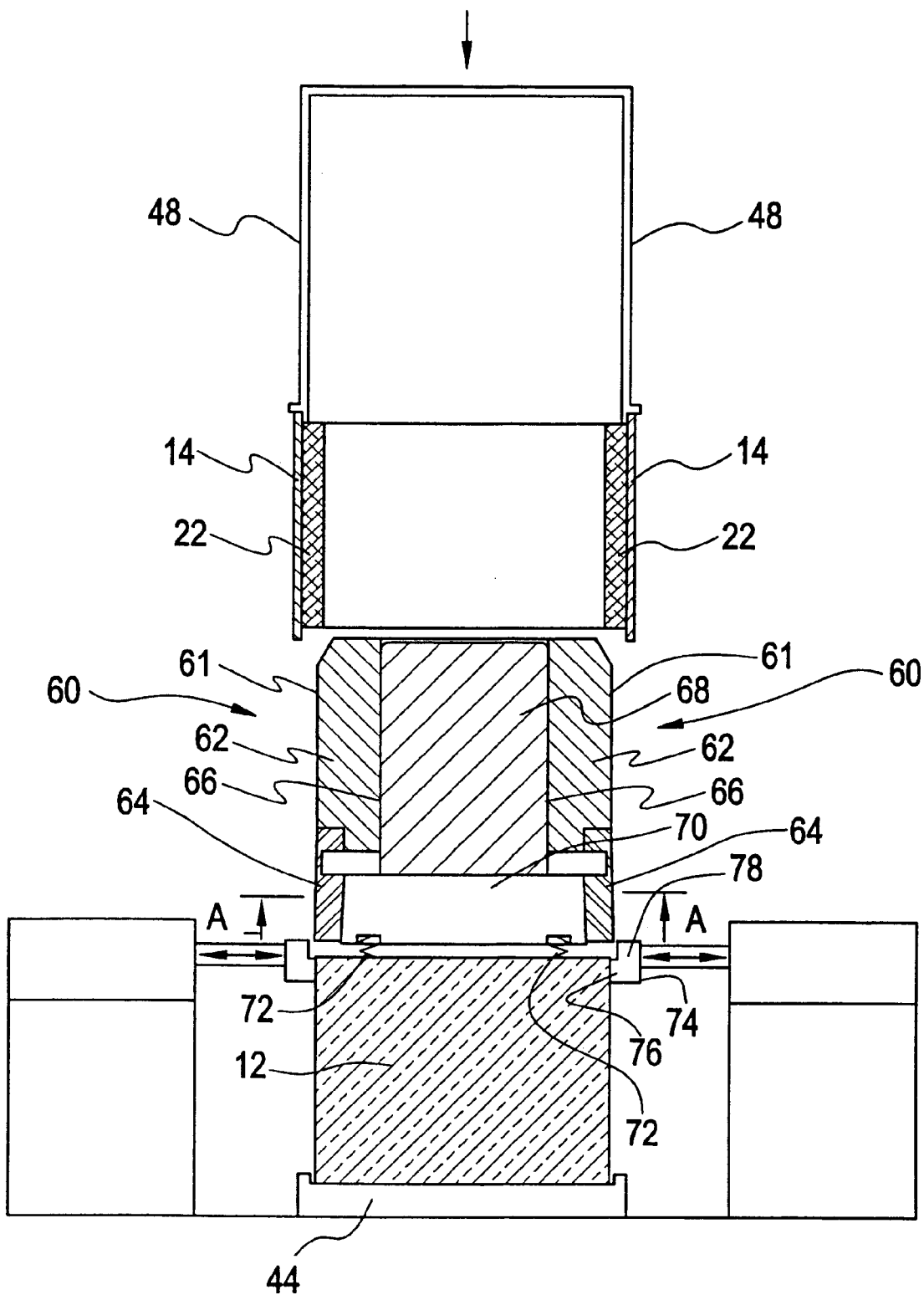
FIGS. 6A–6D are cross-sectional illustrations of the formation stages of a fourth embodiment of the instant method of assembling a catalytic converter.
Figure 7:
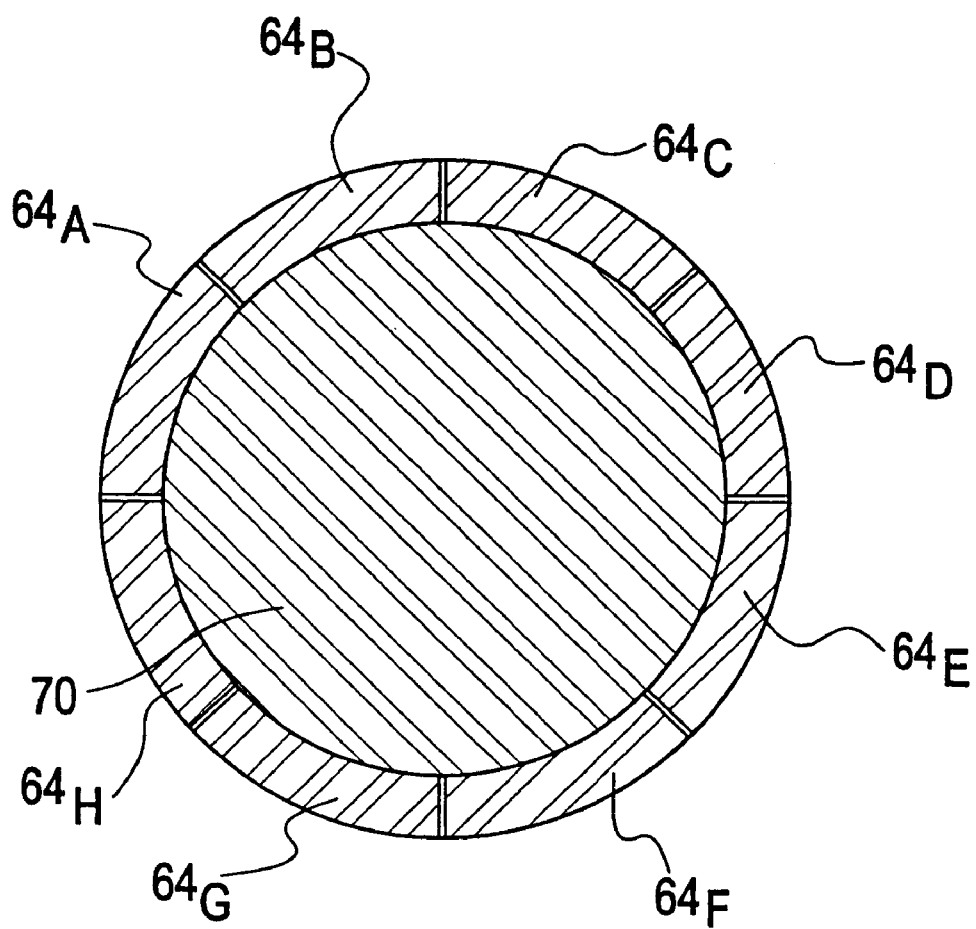
FIG. 7 is a top view of the tapered portion of the compression device utilized in the fourth embodiment taken along line A—A of FIG. 6A.

Referring initially to FIG. 6A, the first step involves placing the ceramic substrate 12 onto a supporting plate 44 and thereafter placing the compression device 60 on the top surface of the ceramic substrate 12 with the springs 72 contacting the substrate. The compression device is held in position on the substrate 12 with the minimum amount of force sufficient to hold the device in place without compressing the springs 72. As before, the means for securing the substrate 12 in place can be any means capable of holding the substrate in place. In this embodiment, a series of multiple sizing jaws 74 positioned on the external circumferential surface of the substrate 12 function to hold the substrate in place. Each of the sizing jaws includes two sections: (1) the first section 76 is in direct contact, and when combined with the other jaws in place, surrounds the outer circumferential surface of the upper portion of the substrate; and, (2) the second section 78 extends above the substrate's top surface, and in combination with the other jaws in place, forms a slightly larger diameter than that exhibited by the substrate 12.

Figure 6B:
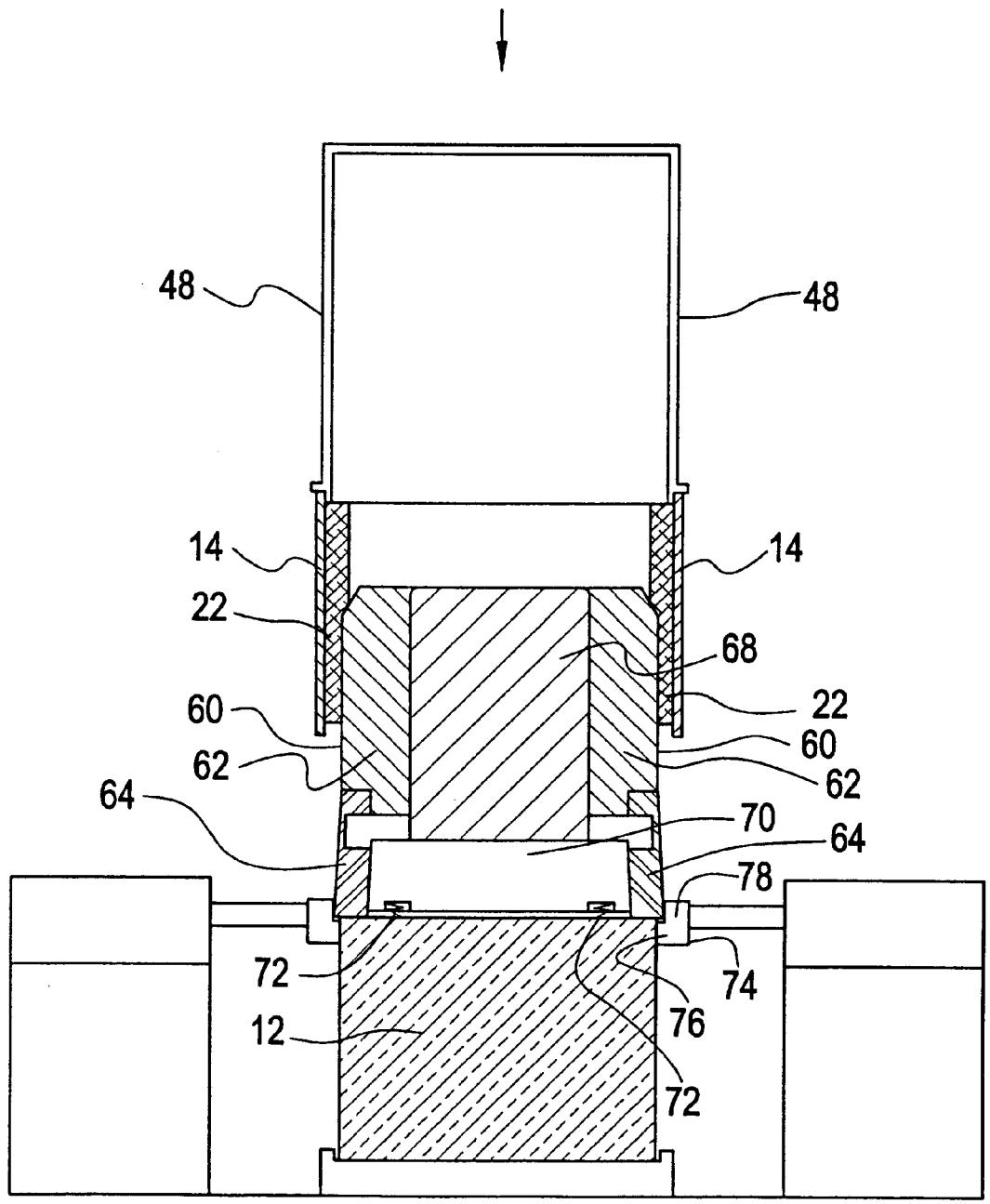

The method next involves installing the mat layer 22 within the metal shell 14 in a manner as described above to form a encircling mat layer; inserting into the metal shell 14 a sufficient amount of the mat layer material 22 to form an encircled mat layer. The mat layered metal shell 14 is then secured to a mounting plate 48 and inserted onto the external surface of compression device 60 as illustrated in FIG. 6B. Downward force is then applied to the mounting plate 48 thereby causing the attached mat layered metal shell 14 to become vertically aligned with the aforementioned mounted substrate/compression device configuration. This downward force is continued until the mat layered metal shell 14 slides along the external surface of the mounted compression device until the layered mat 22 is completely on, and aligned with, the compression device straight portion 62. Note that no additional force is yet applied to the compression device 60 except for that aforementioned force sufficient to hold the springs 72 in contact with the top surface of the substrate 12.

Further downward force is applied to the compression device 60 only, thereby forcing the compression device into contact with the substrate 12. As the springs 72 of the plunger 66 contact the top surface of the substrate 12 the force of the springs prevents the plunger tapered portion 70 from coming into actual contact with the substrate. The opposing force of the springs 72 which does not affect the tapered collet leaves 64 allows the collet to slide along the plunger tapered portion 70. The result is that collet device leaves 64 are caused to radially expand into contact with the upper portion 78 of the series of sizing jaws. In this way, the size of the compression device, particularly size of the tapered collet, conforms to the size of the substrate and is capable of adjusting to size changes from substrate to substrate. In other words, the method is capable of compensating for substrate to substrate diameter variation.

It is contemplated that rather than the aforementioned use of springs, the plunger could include different means for enabling the plunger 66 to be forced or moved in a direction away from the substrate once in contact with the substrate thereby causing the compression device tapered portion to slide along the plunger tapered portion 70. Options include: (1) incorporating into the plunger a hydraulic feature causes the plunger to move in a direction away from the substrate; or, (2) configuring the compression device such that the plunger is inserted in a threaded configuration, such that when plunger is in contact with the substrate, the plunger can be screwed in a manner such that it is pulled away from the substrate. In either case, movement of the plunger 66 away from the substrate 12 does not affect the compression device tapered collet leaves 64, the result being that the tapered collet slides along the plunger tapered portion 70. As before, the effect is that the leaves 64 are caused to radially expand into contact with the upper portion 78 of the series of sizing jaws.

Figure 6C:
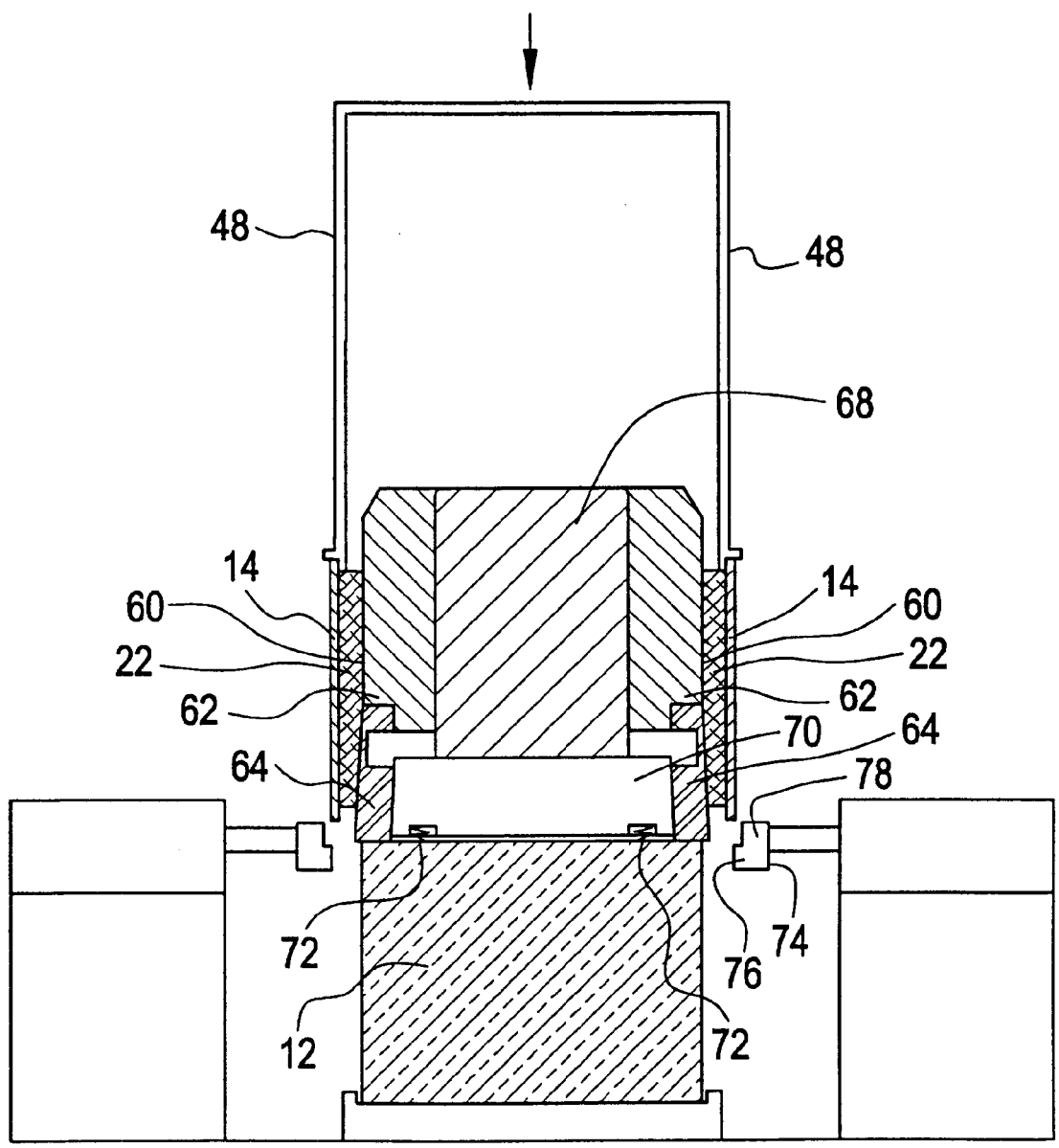
Figure 6D:
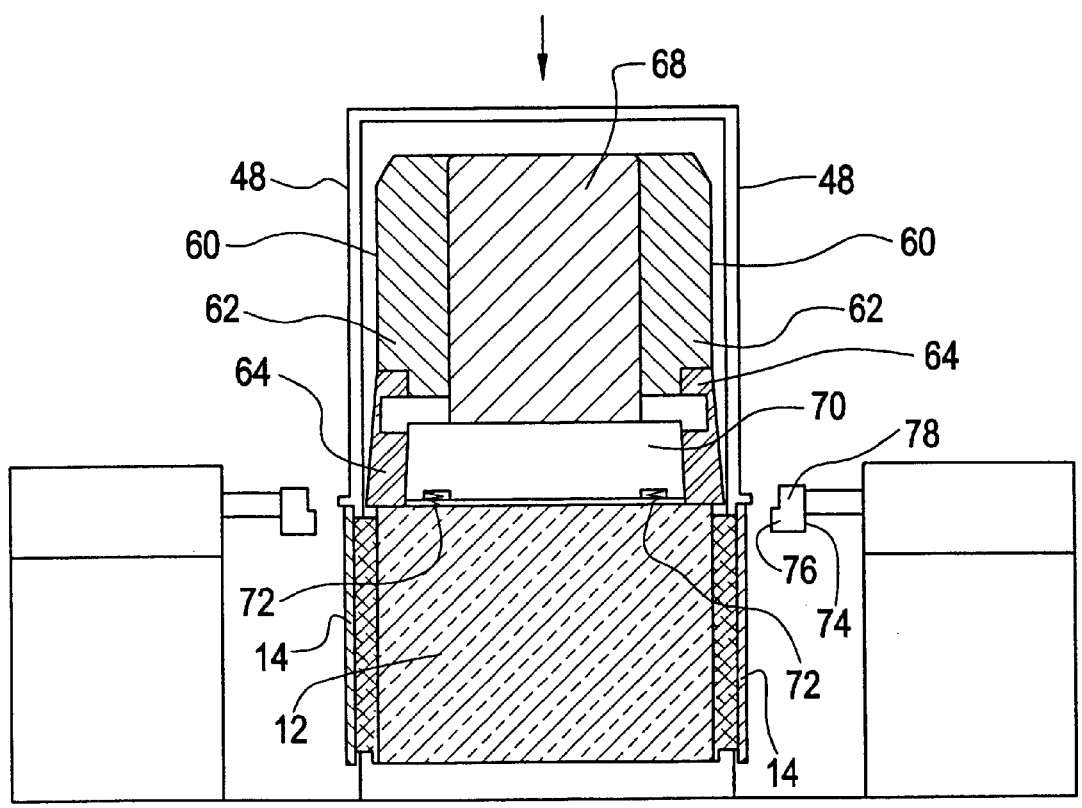

Referring now to FIG. 6C, the next step involves applying downward pressure on the mounting plate 48 thereby causing the mat layered metal shell 14 to slide along the external surface of the compression device 61 to a position just above the point where it contacts the circumferential series of sizing jaws 74, whereupon the sizing jaws are removed. FIG. 6D illustrates the next step that involves, immediately subsequent to the removal of the sizing jaws, applying further downward force to the mounting plate 48 thereby causing the mat layered metal shell 14 to slide along the substrate 12 until the mounting plate 48 contacts the supporting plate 44 thus aligning the mat layer 22 with the ceramic substrate 12.

As in previous embodiments, the result of the tapered collet of the compression device forming a cross-sectional shape that substantially matches, and an area that is slightly larger than, that of the ceramic substrate 12, is that the initial mat gap bulk density, prior to the mat layer being aligned with the substrate, is higher than that final installed mat gap bulk density. Stated another way, as the mat layer is completely aligned with the ceramic substrate the mat layer relaxes (compression releases), thereby resulting in the ceramic substrate only being subject to the release compression of the mat layer and the encircled mat layer reaching its final predetermined mat density.

As described for the previous continuous embodiment, the mat release is a continuous process and occurs the entire time that the encircling mat is forced from the tapered collet onto the substrate. Again the entire encircling mat does not fully reach it final predetermined gap bulk density until the encircling mat is fully positioned on the substrate, although the leading portions may reach this density prior to the entire encircling mat being in its final position.

Figure 8:
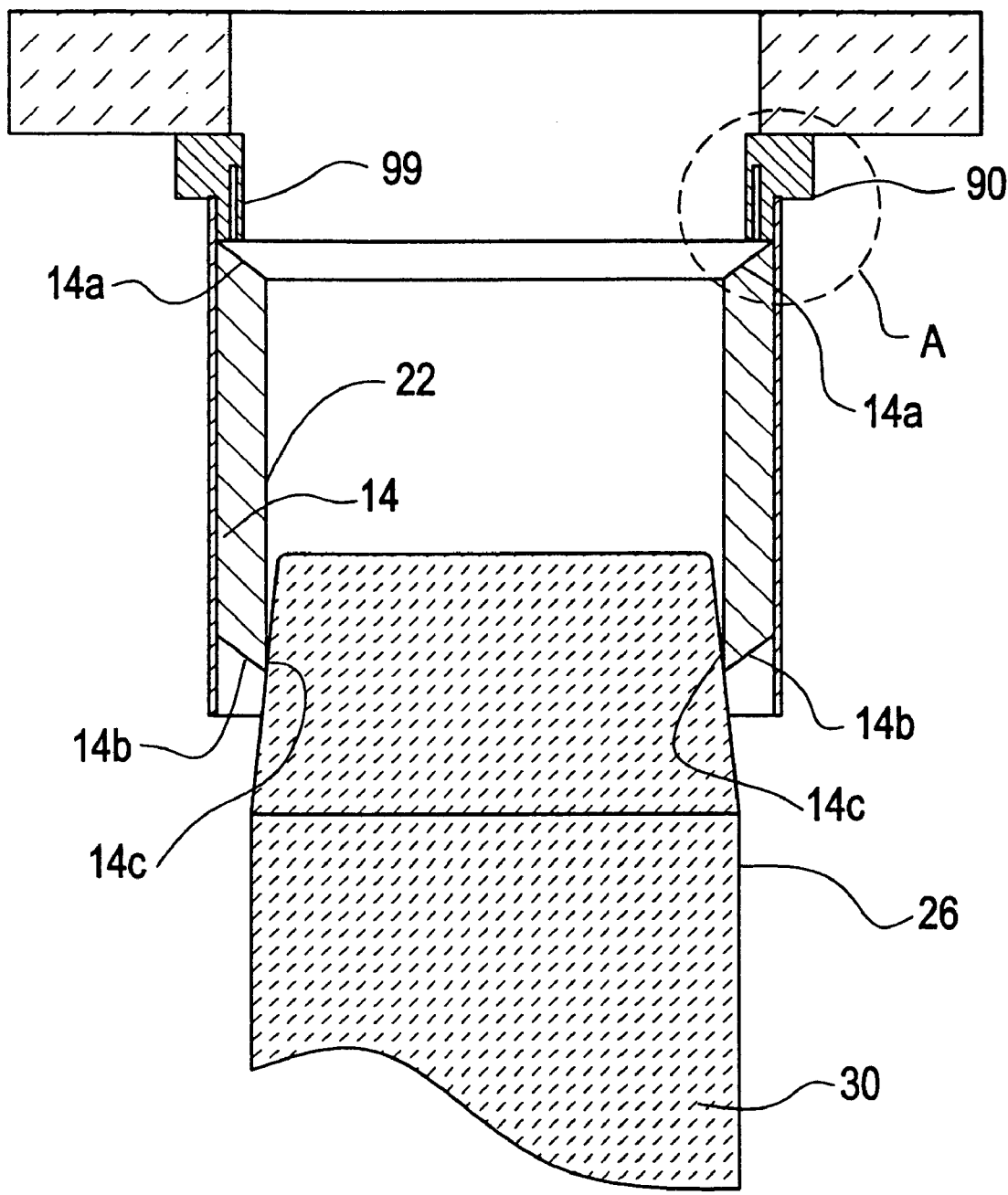
FIG. 8 is a cross-sectional illustration of a side view of an embodiment of the instant method of assembling a catalytic converter utilizing a flexible support ring.

In a preferred embodiment, two additional features are included in the method of assembling the catalytic converter in order to reduce the possibility of mat shear or mat loss: (1) maintaining the encircling mat in place during the insertion of the compression device and substrate; and, (2) use of a uniquely shaped encircling mat layer. Referring now to FIG. 8, illustrated therein is one embodiment of maintaining the encircling mat in position; specifically, a flexible support ring. The positioning of this flexible support ring 90, which is inserted into the end of the metal shell 14, prevents the encircling mat 22 from sliding within the metal shell 14 as the compression device is forced through the mat. Alternatively, it is contemplated that the use of an adhesive located between the encircling mat and the metal shell could be used to maintain the mat in position.

Figure 9A:
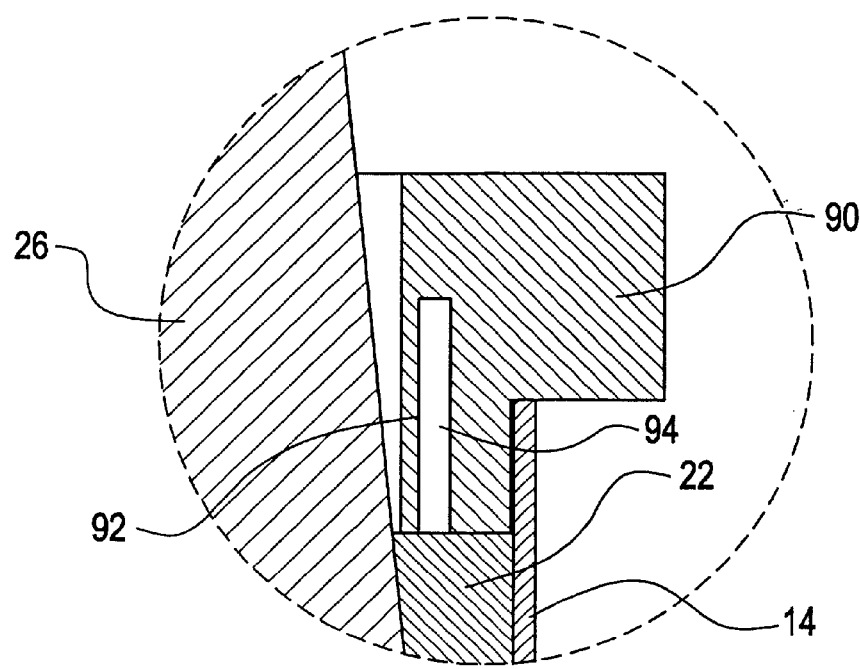
FIGS. 9A–9B are cross-sectional exploded views of the portion of FIG. 6 designated "A"
Figure 9B:
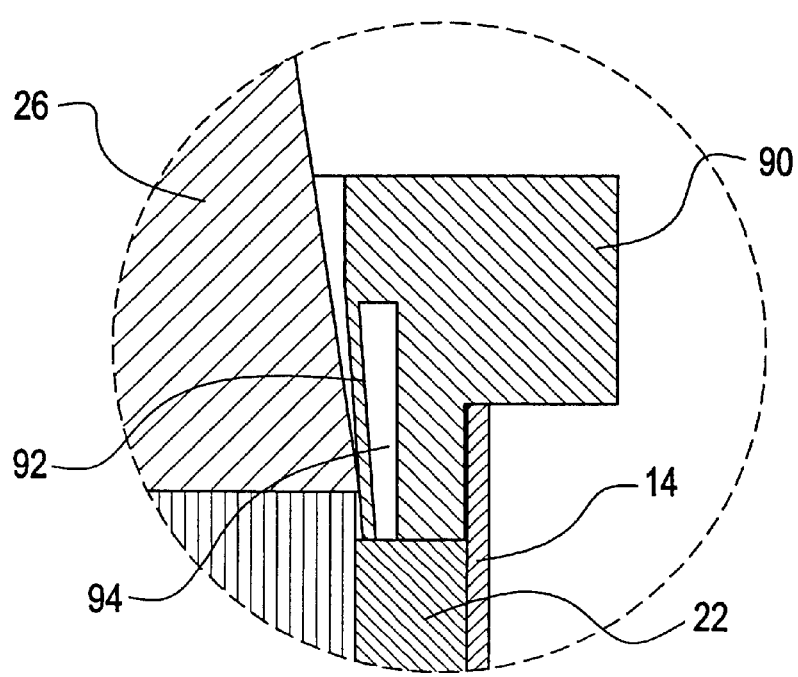

Referring to FIGS. 9A and 9B, exploded views of the section designated A in FIG. 6, each illustrate in greater detail the design and functioning of the flexible support ring. FIG. 9A illustrates the flexible ring 90 in its non-flexed configuration. The flexible ring comprises an inner leaf portion 92 adjacent a recessed groove 94 that functions to allow the leaf portion 92 room to expand or flex outward. The flexible support in its un-flexed configuration (i.e., leaf portion un-flexed), as exhibited in FIG. 9A, exhibits an inner diameter that is just slightly smaller than the diameter exhibited by the largest portion of the compression device 26; the diameter of the straight non-tapered portion 30. The sizing of the flexible support ring 90, un-flexed configuration depicted therein, i.e., inner diameter slightly smaller than the largest diameter of the compression device, ensures that the encircling mat is not forced beyond the flexible ring and thus functions only to hold the position of the encircling mat 14 constant.

Referring FIG. 9B, illustrated therein is the flexible ring 90 in its flexed configuration. Exhibited therein is that point when the compression device 26 is pushed through the encircling mat 22 and the largest diameter portion of the compression device (the straight portion 30) contacts the portion of the encircling mat 22 proximate the flexible leaf 92. Shown is the compression device causing the leaf 92 to flex outward (groove 94 is closed somewhat) to compensate for the larger diameter size of the compression device, thereby ensuring that the absence of a gap is maintained, and therefore the mat is prevented from being pulled up.

It is within the knowledge of one skilled in the art to determine the exact un-flexed inner diameter of the flexible support ring and the size/width of the grooved recess so as to result in a configuration where the compression device slides along and through the encircled mat layer without any gap forming between the compression device and flexible support ring. In other words, the design of a system configuration that results in little or no mat drag and/or pinching of the mat.

Referring again to FIG. 8, illustrated is the aforementioned parallelogram-shaped encircling mat 22 geometry. The simplest way of obtaining this initial mat configuration is by cutting the ends 14A, 14B of the encircling mat at an angle to form a parallelogram and orienting the encircling mat 22 in the metal shell 14 so that the leading edge on the inside of the encircling mat layer 14C will be closest in proximity to the compression device 26. As the compression device 26 is forced along and through the encircling mat layer 14, the encircling mat is, via friction (i.e., dragging) caused to exhibit the standard shape where the end surfaces are parallel with the substrate end surfaces.

Figure 10B:
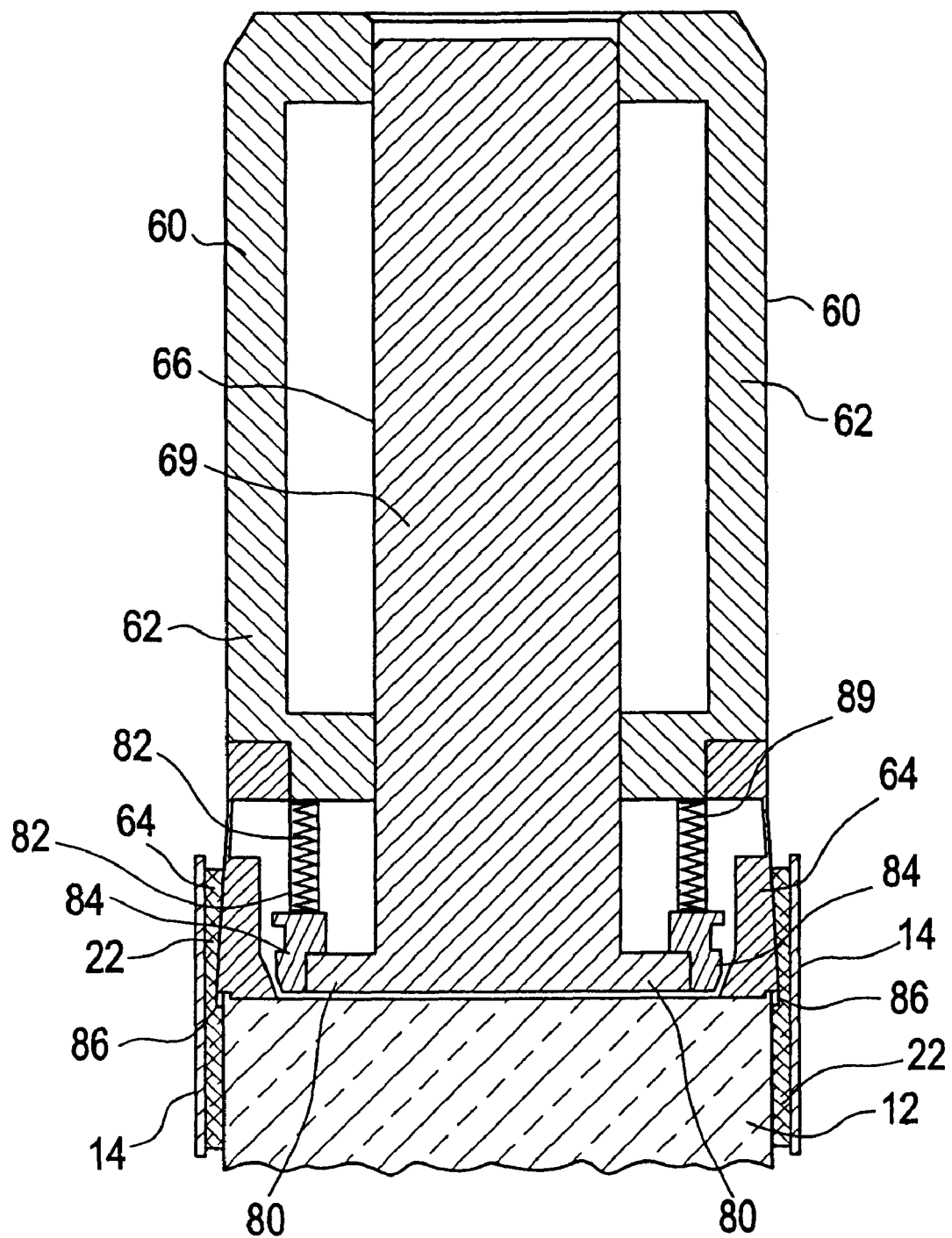

A modified version of the compression device is illustrated in FIGS. 10 and 10A. Specifically, the second portion of the plunger, the portion located within the tapered collet of the compression device and which is proximate the actual substrate, is modified to include means to independently and radially expand each of the tapered collet leaves. The benefit of this independent radial expansion of the segments is that each collet leaf will be forced to expand only that radial distance that corresponds to the size of the substrate, thus compensating for any out-of roundness that the substrate exhibits. Referring specifically to FIGS. 10A and 10B, the second portion of the plunger comprises merely a T-shaped bottom portion 80 that communicates with a series of spring 82 loaded tapered wedges 84, one each for each corresponding circumferentially located tapered collet leave 64. Additionally the collet's tapered leaves include an sizing extension 86 that extends below the main portion of the collet. Furthermore, the diameter of the collet 64 is sized such that it is slightly larger than the diameter of the substrate 12 that is to be assembled within the mat layered metal shell; i.e., the sizing extension 86 is outside of the diameter of the substrate 12.

Figure 11:
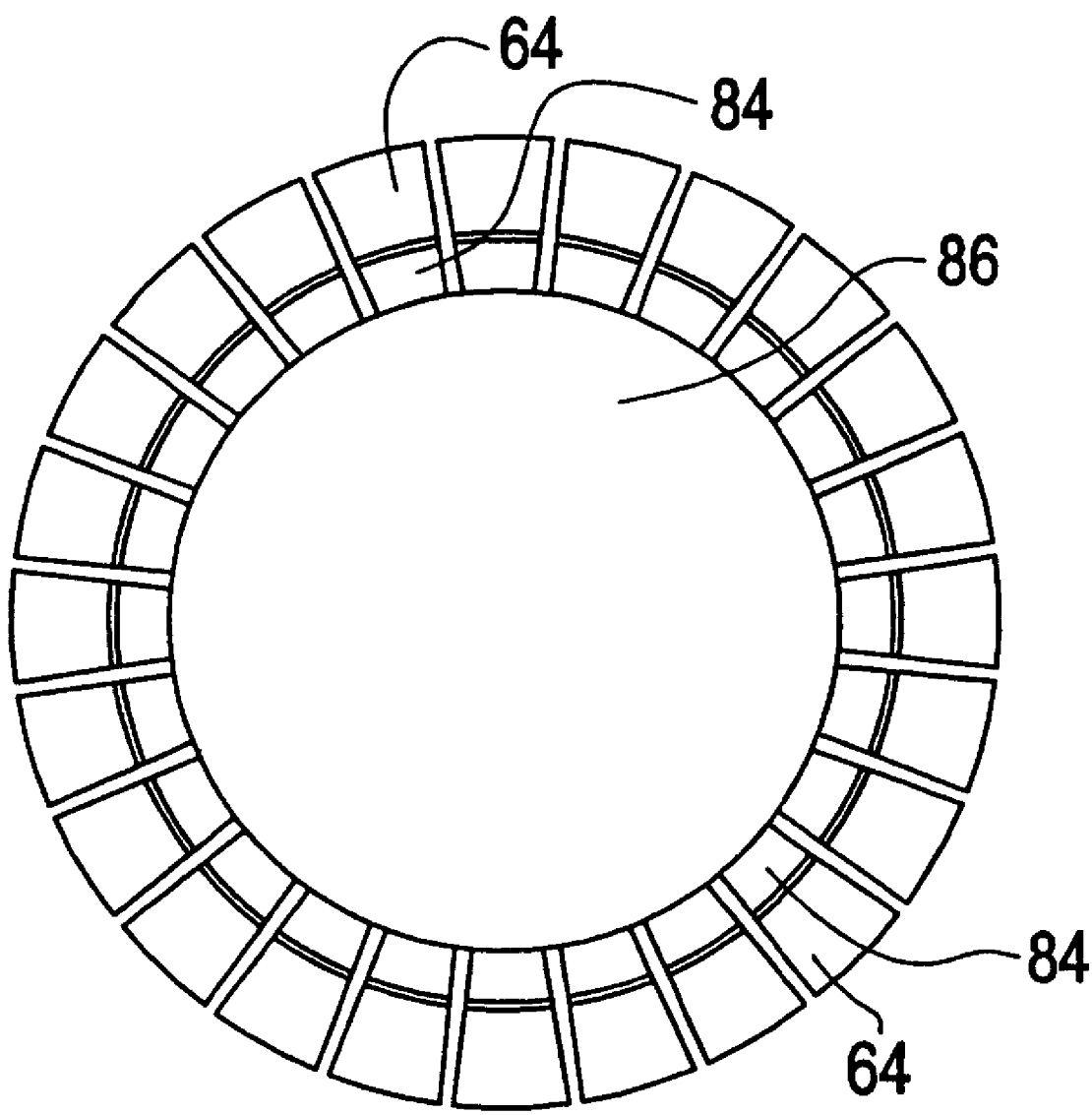
FIG. 11 is a top view of the modified plunger taken along line B—B of FIG. 8.

FIG. 11 is a top view, taken along line B—B of FIG. 10A, of the collet and its associated leaves. In the embodiment shown the compression device's collet includes 24 independently controlled tapered wedges 84 and 24 associated expandable leaves 64; the actual number of tapered wedges/leaves utilized is not critical to the invention.

The method utilizing the modified plunger is similar to that for the fourth embodiment with the exception being in the operation of the plunger. At some point during the period when the mat layered metal shell slides along the external surface of the mounted compression device 60 and prior to when the compression device 60 is forced into contact with the substrate 12, the plunger 66 is caused to move away from the substrate 12. In this way the springs 82 are compressed slightly and the tapered wedges 84 are refrained from contacting the tapered portion of the leaves 64; i.e., there is a gap 88 between the tapered wedges 84 and the tapered leaves 64. At some point during which the mat layered metal shell 14 slides onto the tapered collet leaves 64 it results in a the encircling mat applying a force sufficient to hold the sizing extension 86 against the outer surface of the substrate 12. As a result of the series of independently, radially movable collet leaves 64 and corresponding sizing extensions 86, each collet leaf 64 is forced into contact with the outer periphery of the substrate 12, thus matching the size and shape of the substrate 12 as close as possible. In other words, each of the leaves 64 is independently moved radially inward only that distance until it contacts the outer periphery of the substrate 12; i.e., independent of the distance the other leaves 64 are allowed to radially move. Thus, if the substrate is out-of-round, the tapered leaf will be allowed to move a variable distance so as to compensate for this out-of roundness. This is contrary to the previous embodiment where all of the tapered segments move the same radial distance or that distance corresponding to the distance of the first segment to contact the sizing jaw.

Once the encircled mat layered metal shell 14 is forced to move over the collet leaves 64, the plunger 66 is forced towards the substrate releasing the compression on the springs 82. As a result of the plunger 66 being forced toward the substrate 12, the tapered wedges 84 are allowed to move down into contact with the inner surface of the tapered leaves 64 with each tapered wedge 84 thereby forcing its corresponding collet leaf 64 against the encircling mat 22. The springs 82 are sized such that the collet leaves 64 are forced into contact with the encircling mat 22, but do not compress the mat, but only hold the collet leaf 64 in its original position with the sizing extension 86 contacting, and resting on, the outer periphery of the substrate 12. The result is that the mat is compressed to an initial mat gap bulk density yet the substrate 12 is protected from being damaged or crushed. As the encircled mat layered metal shell 14 is further caused to move down and onto the substrate 12, the encircling mat layer relaxes and compresses against the substrate 12 at the predetermined final mat gap bulk density.

Thus in this final embodiment, regardless of the geometry of the finished honeycomb ceramic part size and out-of roundness variability, the method is capable of producing catalytic converters wherein the retentive frictional force remains consistent, uniform and optimized.

Like the previous continuous assembly embodiments describe, the mat release is a continuous process and occurs the entire time that the encircling mat is forced from the tapered independent collets onto the substrate. Again the entire encircling mat does not fully reach it final predetermined gap bulk density until the encircling mat is fully positioned on the substrate, although, as described before, the leading portions of the encircling mat layer may reach this density prior to the entire encircling mat layer being in its final position.

Although each of the embodiments described above utilize a compression device for compressing the mat against the substrate, it is contemplated that the encircling mat could be placed in compression, at the initial gap bulk density, prior to insertion into the metal shell; e.g., the encircling mat could be vacuum sealed in a plastic wrap and then inserted in the metal shell. Once the encircled mat is inserted inside the metal shell, the ceramic substrate could then be inserted into the encircled mat layered metal shell and thereafter the plastic wrap could be punctured. Puncturing of the plastic would allow air to get into the mat thereby allowing the mat to subsequently expand against the ceramic substrate at its predetermined final mat gap density. The plastic wrap that remained around the encircled mat would eventually be burned off once the converter came up to temperature during actual operation.

It should be noted that regardless of the embodiment utilized to assemble the catalytic converter the mat layer is compressed against the ceramic substrate such the ceramic substrate is under sufficient radial pressure to prevent axial movement of the ceramic substrate during normal engine operation.

In sum, the present method utilizes a high enough compressive force so as to produce a catalytic converter having a mat layer which exhibits a sufficient retentive force to maintain the substrate in place, yet the method utilizes a low enough "mat release" compressive force so as not to damage mat layer. Furthermore, the compressive force is sufficient to result in a mat layer that is dense enough to resist gas erosion.

EXAMPLES

To further illustrate the principles of the present invention, there will be described one example of a honeycomb-metal shell assembly formed according to the invention and two comparative honeycomb-metal shell assemblies formed by prior art methods. However, it is to be understood that the examples are given for illustrative purpose only, and the invention is not limited thereto, but various modifications and changes may be made in the invention, without departing from the spirit of the invention.

Example 1 is a honeycomb-can assembly that was assembled according to the second embodiment of the instant invention described above. The honeycomb substrate utilized in this example comprised a 3 in. long, 350 cell/in$^2$ cordierite honeycomb substrate exhibiting approximately a 4.16" diameter and cell walls exhibiting a 5.5 mil thickness. The encircling mat utilized was a hybrid laminar consisting of both an intumescent and a non-intumescent layer and exhibiting a weight basis of 4550 g/m$^2$. The radial pressure distribution exerted against the substrate, during the formation operation, and after formation, was measured utilizing a Tekscan Pressure Sensor. Specifically measured and recorded was the maximum pressure experienced across the radial area of the substrate, at any point along the axial length of the substrate.

Figure 12:
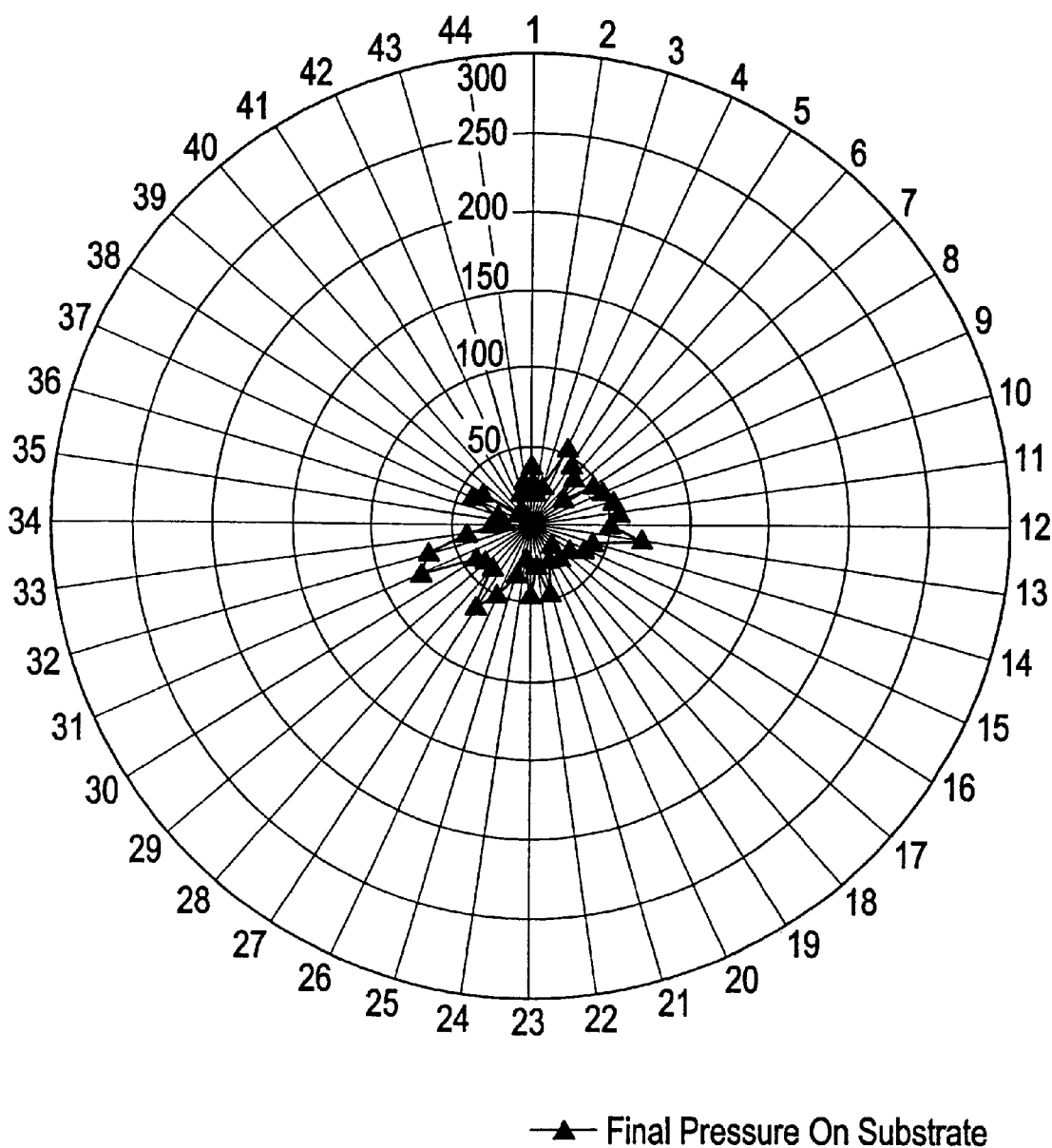
FIGS. 12–14 are pressure distribution graphs illustrating the pressure distribution across the radial area of ceramic honeycomb substrates assembled by the instant method, a stuff-mounting technique, and a tourniquet wrap technique, respectively.

Referring to FIG. 12, reported therein is the radial pressure distribution (psi) exhibited by Example 1. An examination of FIG. 12 shows that the substrate was not subject to any pressure during the assembly process utilizing the compression device, and that the maximum pressure to which substrate was exposed to, was that after formation in the final assembled form. In other words, the maximum pressure the substrate was exposed to was after formation and that pressure was approximately 75 psi.

Figure 13:
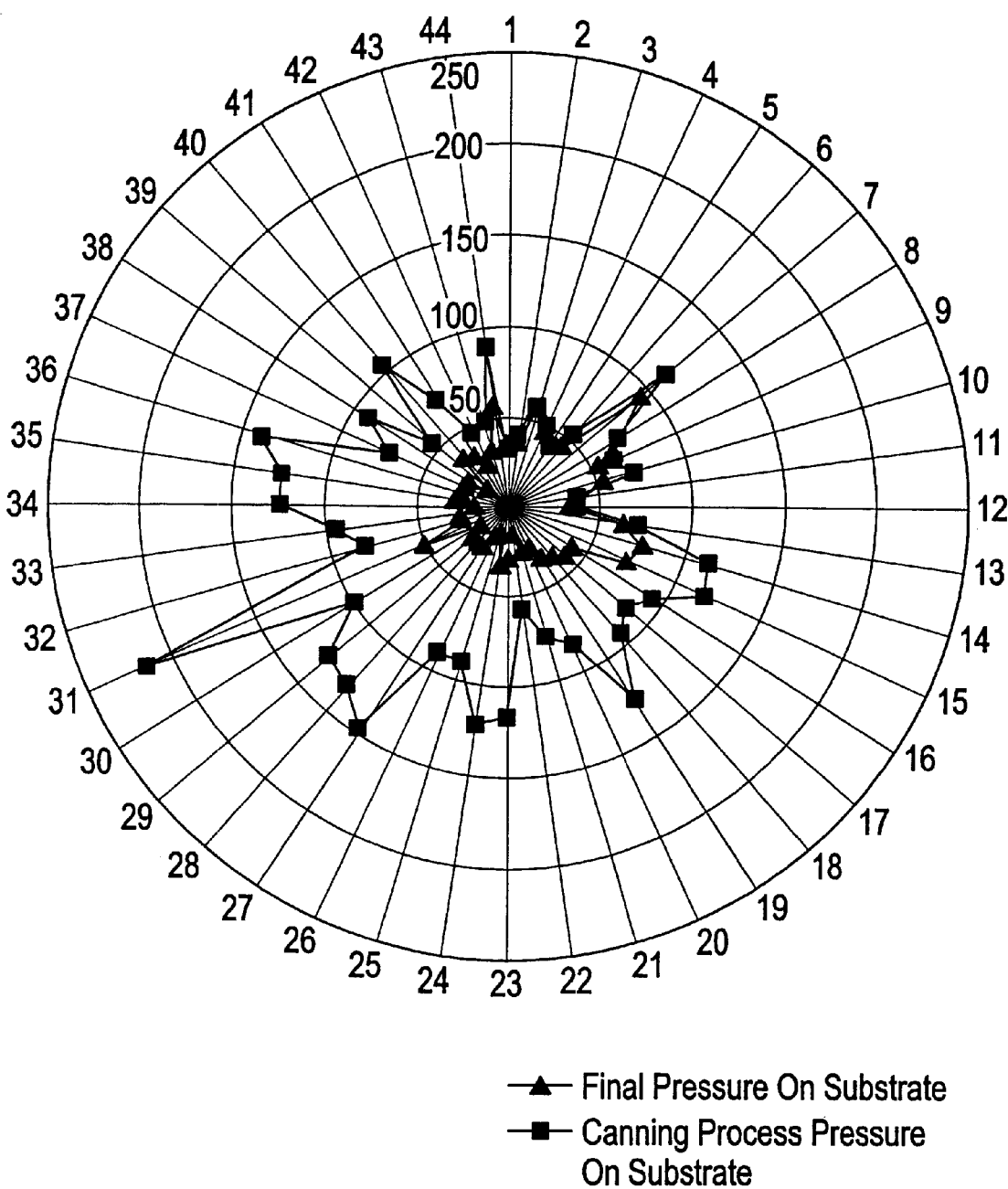

Example 2 is a honeycomb-can assembly that was assembled utilizing a standard "stuff-mounting" assembly method; the ceramic substrate and the encircling utilized were of the same type and exhibited the same dimensions as that for Example 1. Referring to FIG. 13, reported therein is the pressure distribution for Example 2 both during the assembly process and after assembly; both recorded in psi. An examination of FIG. 13 shows that the maximum pressure to which substrate was exposed to was during assembly utilizing the stuff mounting process and that pressure was greater than 200 psi.

Figure 14:
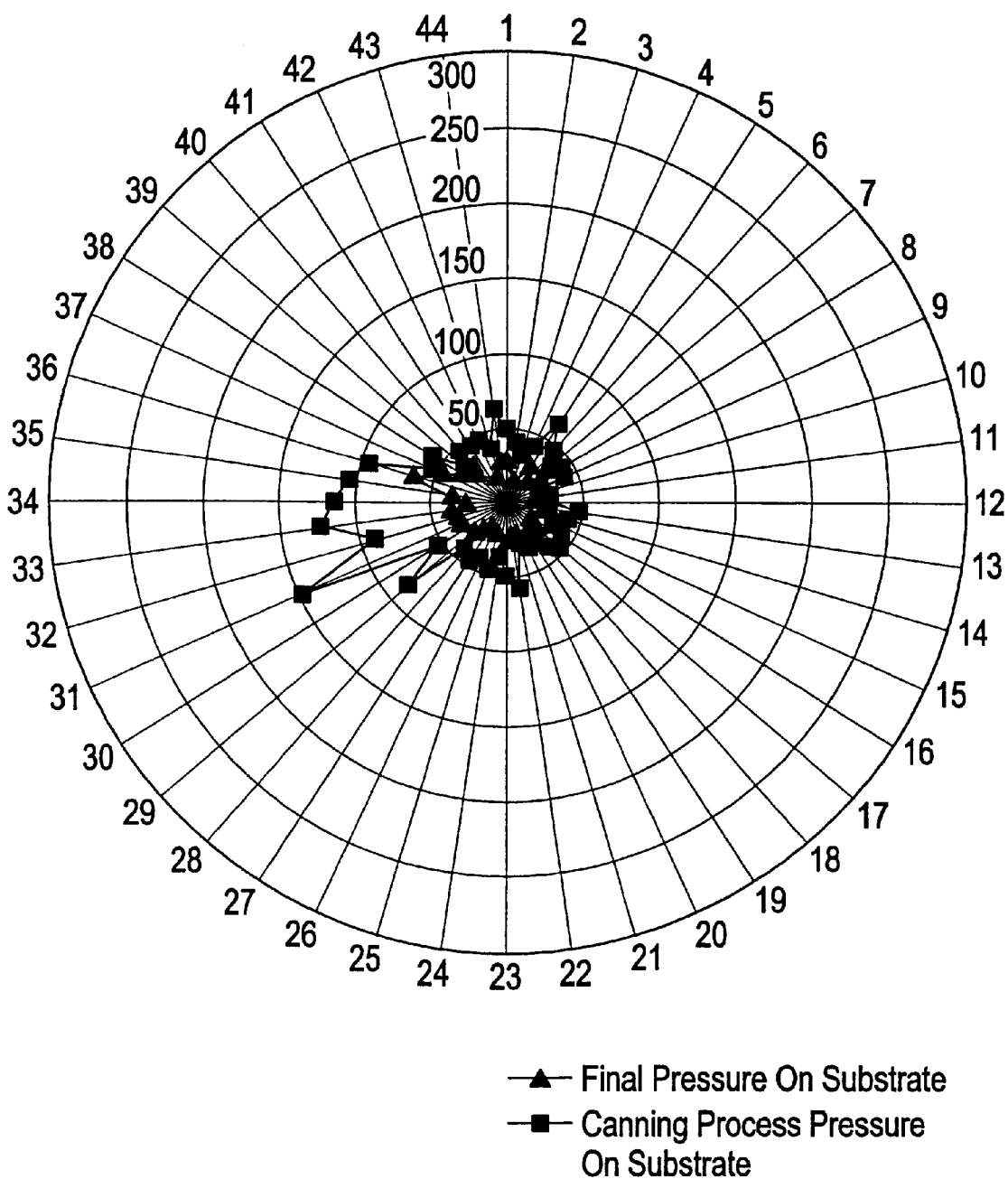

Example 3 is a honeycomb-can assembly that was assembled utilizing a standard "tourniquet-wrap" assembly method; the ceramic substrate and the encircling utilized were of the same type and exhibited the same dimensions as that for Example 1. Referring to FIG. 14, reported therein is the pressure distribution for Example 3 both during the assembly process and after assembly; both recorded in psi. An examination of FIG. 14 shows that the maximum pressure to which substrate was exposed to was during assembly utilizing this tourniquet wrap technique and that pressure was approximately 150 psi.

It is to be understood that the present invention is not limited to the embodiments described above, and that various changes and modifications may be effected therein by one skilled in the art without departing from the intended scope or spirit of the invention.

We claim:

1. A method of assembling a catalytic converter comprising a monolithic ceramic substrate encircled by a resilient supporting mat and mounted within a metal shell comprising the steps of:

providing an open-ended one piece metal shell;
   positioning a layer of resilient mat material on the inside surface of the metal shell to form an encircling mat layer;
   compressing the encircling mat layer; and
   inserting, the ceramic substrate into the metal shell while retaining the encircling mat layer on the inside surface of the shell.

2. A method of assembling a catalytic converter for purifying exhaust gases from an internal combustion engine, the converter comprising a monolithic ceramic substrate surrounded by a resilient supporting mat and enclosed in a metal shell, comprising the steps of:

providing a metal shell having a predetermined shape that substantially matches the shape of the ceramic substrate;
   inserting into the metal shell a sufficient amount of the supporting mat material to form an encircling mat layered metal shell;
   compressing the encircling mat layer to an initial gap bulk density, the initial gap bulk density being higher than a predetermined final gap bulk density;
   releasing the compression on the mat layer and inserting the substrate into the encircling mat layer-lined metal shell with the resultant mat layer being compressed against the ceramic substrate at the final predetermined gap bulk density.

3. The method of claim 2 wherein the compressing of the encircling mat layer involves providing a compression device having a small and a large portion, the large portion having a cross sectional shape that substantially matches that of the monolithic ceramic substrate and a cross sectional area that is larger than the cross sectional area exhibited by the monolithic ceramic substrate;. and
   inserting the compression device into the encircling mat layered metal shell and then moving the compression device into the encircling mat layered metal shell so that the large portion contacts encircled mat layer, thereby compressing the mat layer to the initial gap bulk density; and,
   cooling the compressed mat layer thereby holding the mat layer in compression, while the compression device remains in position.

4. The method according to claim 3 wherein after the mat layer is held in compression for a period of time, the releasing step involves removing the compression device and subsequently inserting the ceramic substrate prior to the mat layer reaching the final gap bulk density.

5. The method of claim 3 wherein the compressing of the encircling mat layer comprises the following steps:

providing a compression device wherein the small portion is tapered and the large portion is a straight cavity portion, the straight cavity portion sized such that the ceramic substrate can be installed within straight portion, the straight cavity portion exhibiting annular walls of a length at least as long as the width of the encircling mat layer, the circumferential shape of the annular walls that substantially matches that shape of the ceramic substrate;
   inserting into the cavity portion the ceramic substrate and securing the ceramic substrate within the cavity with a supporting member that is attached to the annular wall of the compression device;
   sliding the encircling mat layered metal shell onto the tapered portion of the compression device until the straight cavity portion is aligned with the width of the mat layer and abuts the supporting member thereby compressing the mat layer to the initial gap bulk density.

6. The method according to claim 5 wherein the releasing step involves removing the compression device and the supporting member thereby releasing the initial compression of the mat layer at its initial gap bulk density and allowing the mat layer to release and be compressed against the ceramic substrate at the final predetermined gap bulk density.

7. The method of claim 3 wherein the compressing of the encircling mat layer comprises the following steps:

providing a compression device wherein the small portion is tapered portion and the large portion comprises a least straight portion that exhibits a length at least as long as the width of the encircling mat layer mat, a cross sectional shape that substantially matches that of the ceramic substrate, and a cross sectional area that is larger than the cross sectional area exhibited by the ceramic honeycomb substrate;
   placing the ceramic substrate on a supporting plate and thereafter installing and securing the compression device on the top surface of the ceramic substrate;
   aligning the ceramic substrate and mounted compression device;
   securing the encircling mat layered metal shell to a mounting plate;
   sliding together the substrate/compression device and the mounted encircling mat layered metal shell until the supporting mat is aligned with the straight portion thereby compressing the mat layer to the initial gap bulk density.

8. The method according to claim 7 wherein the releasing step involves further sliding together the substrate/compression device and the mounted encircling mat layered metal shell until the mounting plate contacts the supporting member thereby aligning the mat with the ceramic substrate, thereby releasing the initial compression of the mat layer at its initial gap bulk density and allowing the mat layer to reach its final gap bulk density.

9. The method of claim 3 wherein the compression device comprises a conical device wherein the large portion is that portion of the conical device exhibiting the largest diameter so as to exhibit a cross sectional shape that substantially matches that of the ceramic substrate and a cross sectional area that is larger than the cross sectional area exhibited by the ceramic honeycomb substrate.

10. The method of claim 2 wherein the compressing of the supporting mat involves provided a compression device wherein the small portion includes a straight portion and the large portion comprises a radially expandable segmented tapered collet, the tapered collet being capable of expanding to a cross sectional area that is equal to or larger than the cross sectional area exhibited by the monolithic ceramic substrate;

inserting onto the straight portion of the compression device the encircling mat layered metal shell and causing the encircling mat layered metal shell to slide along the straight portion until the straight portion is aligned with the width of the mat so as to compress the mat layer; and, radially expanding the tapered collet to a cross sectional area that is larger than the cross sectional area exhibited by the monolithic ceramic substrate; and thereafter, further causing the encircling mat layered metal shell to slide along the compression device until the encircling mat layered is metal shell aligned with the tapered collet thereby further compressing the supporting mat to the initial gap bulk density.

* * * * *